(12) United States Patent
Gao et al.

(10) Patent No.: US 12,557,031 B2
(45) Date of Patent: Feb. 17, 2026

(54) POWER CONTROL FOR UPLINK TRANSMISSIONS TOWARDS MULTIPLE TRPS

(71) Applicant: Telefonaktiebolaget LM Ericsson (publ), Stockholm (SE)

(72) Inventors: Shiwei Gao, Nepean (CA); Mattias Frenne, Uppsala (SE); Helka-Liina Määttänen, Helsinki (FI); Siva Muruganathan, Stittsville (CA); Jianwei Zhang, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 354 days.

(21) Appl. No.: 18/012,242

(22) PCT Filed: Jun. 25, 2021

(86) PCT No.: PCT/IB2021/055717
§ 371 (c)(1),
(2) Date: Dec. 22, 2022

(87) PCT Pub. No.: WO2021/260658
PCT Pub. Date: Dec. 30, 2021

(65) Prior Publication Data
US 2023/0262608 A1 Aug. 17, 2023

Related U.S. Application Data

(60) Provisional application No. 63/044,851, filed on Jun. 26, 2020.

(51) Int. Cl.
*H04W 52/14* (2009.01)
*H04W 52/08* (2009.01)

(52) U.S. Cl.
CPC ......... *H04W 52/146* (2013.01); *H04W 52/08* (2013.01)

(58) Field of Classification Search
CPC ... H04W 52/54; H04W 72/231; H04W 72/40; H04W 52/32; H04W 48/12; H04W 52/38;
(Continued)

(56) References Cited

U.S. PATENT DOCUMENTS

2016/0374026 A1 12/2016 Dinan
2018/0368017 A1 12/2018 Sundararajan et al.
(Continued)

FOREIGN PATENT DOCUMENTS

CN 110536399 A 12/2019
CN 111093257 A 5/2020
(Continued)

OTHER PUBLICATIONS

Author Unknown, "Technical Specification Group Radio Access Network; NR; Multiplexing and channel coding (Release 16)," Technical Specification 38.212, Version 16.1.0, Mar. 2020, 3GPP Organizational Partners, 146 pages.
(Continued)

*Primary Examiner* — Tu X Nguyen
(74) *Attorney, Agent, or Firm* — Withrow & Terranova, PLLC

(57) ABSTRACT

Systems and methods for enabling power control of multiple Transmission Reception Points (TRPs) are provided. In some embodiments, the wireless device performs at least one of: receiving in a Downlink Control Information (DCI) a first Transmit Power Control (TPC) command and a second TPC command and an indication of a first transmission of the physical channel to a first TRP associated with a first closed-loop and a second transmission of the physical channel to a second TRP associated with a second closed-
(Continued)

loop; determining a first and a second transmit power based on the first and the second TPC commands, respectively; and applying the first and the second transmit power to the first UL transmission and the second UL transmission, respectively. In this way, some embodiments herein enable more accurate per TRP power control with a simple signaling for multiple UL transmissions towards different TRPs scheduled by a single DCI.

25 Claims, 25 Drawing Sheets

(58) Field of Classification Search
CPC ..... H04W 52/18; H04W 52/58; H04W 52/04; H04W 52/10; H04W 52/146; H04W 52/365; H04W 52/367; H04W 52/34; H04W 52/383; H04W 4/40; H04W 4/46; H04W 4/44; H04W 28/0215
See application file for complete search history.

(56) References Cited

U.S. PATENT DOCUMENTS

| | | | |
|---|---|---|---|
| 2019/0104477 A1 | 4/2019 | MolavianJazi et al. | |
| 2019/0141693 A1* | 5/2019 | Guo | H04W 72/23 |
| 2019/0253986 A1 | 8/2019 | Jeon et al. | |
| 2019/0261280 A1 | 8/2019 | Jung et al. | |
| 2019/0335400 A1 | 10/2019 | Gong et al. | |
| 2019/0387479 A1 | 12/2019 | Gong et al. | |
| 2020/0059867 A1 | 2/2020 | Haghighat et al. | |
| 2020/0100193 A1 | 3/2020 | Cheng et al. | |
| 2020/0100232 A1 | 3/2020 | Onggosanusi et al. | |
| 2020/0259625 A1 | 8/2020 | Papasakellariou | |
| 2020/0413289 A1* | 12/2020 | Akkarakaran | H04L 1/1896 |
| 2021/0219246 A1 | 7/2021 | Xu et al. | |
| 2021/0307070 A1* | 9/2021 | Kim | H04L 25/0226 |

FOREIGN PATENT DOCUMENTS

| | | |
|---|---|---|
| CN | 111201741 A | 5/2020 |
| EP | 3481113 A1 | 5/2019 |
| EP | 3731448 A1 | 10/2020 |
| WO | 2010051514 A1 | 5/2010 |
| WO | 2018171761 A1 | 9/2018 |
| WO | 2018228437 A1 | 12/2018 |
| WO | 2019070178 A1 | 4/2019 |
| WO | 2019097478 A1 | 5/2019 |
| WO | 2019134100 A1 | 7/2019 |
| WO | 2019215709 A1 | 11/2019 |
| WO | 2020034442 A1 | 2/2020 |
| WO | 2020044409 A1 | 3/2020 |
| WO | 2020053978 A1 | 3/2020 |
| WO | 2020063923 A1 | 4/2020 |
| WO | 2020093361 A1 | 5/2020 |
| WO | 2021033118 A1 | 2/2021 |
| WO | 2022029658 A1 | 2/2022 |
| WO | 2022029691 A1 | 2/2022 |

OTHER PUBLICATIONS

Notice of Reasons for Refusal for Japanese Patent Application No. 2022-579089, mailed Dec. 25, 2023, 14 pages.
Author Unknown, "Technical Specification Group Radio Access Network; NR; Physical layer procedures for control (Release 16)," Technical Specification 38.213, Version 16.1.0, Mar. 2020, 3GPP Organizational Partners, 156 pages.
Author Unknown, "Technical Specification Group Radio Access Network; NR; Physical layer procedures for data (Release 16)," Technical Specification 38.214, Version 16.1.0, Mar. 2020, 3GPP Organizational Partners, 151 pages.
Author Unknown, "Technical Specification Group Radio Access Network; NR; Radio Resource Control (RRC) protocol specification (Release 16)," Technical Specification 38.331, Version 16.0.0, Mar. 2020, 3GPP Organizational Partners, 835 pages.
Ericsson, "R1-1718655: Further details on closed loop power control," 3GPP TSG RAN WG1 Meeting 90bis, Oct. 9-13, 2017, Prague, Czech Republic, 4 pages.
Qualcomm Incorporated, "R2-2005185: Remaining issues on DL MIMO MAC CE," 3GPP TSG-RAN WG2 Meeting #110e, Jun. 1-12, 2020, Electronic Meeting, 6 pages.
Vivo, "R1-1910229: Discussion on remaining issues on multi TRP transmissoin," 3GPP TSG RAN WG1 #98bis, Oct. 14-20, 2019, Chongqing, China, 15 pages.
ZTE, et al., "R1-1803282: Summary for AI 7.1.6.1 NR UL power control in non-CA aspects," 3GPP TSG RAN WG1 Meeting #92, Feb. 26-Mar. 2, 2018, Athens, Greece, 28 pages.
International Search Report and Written Opinion for International Patent Application No. PCT/IB2021/055717, mailed Sep. 24, 2021, 15 pages.
International Search Report and Written Opinion for International Patent Application No. PCT/IB2021/057220, mailed Nov. 17, 2021, 19 pages.
International Search Report and Written Opinion for International Patent Application No. PCT/IB2021/057168, mailed Nov. 9, 2021, 20 pages.
First Office Action for Chinese Patent Application No. 202180052492. 7, mailed Mar. 28, 2025, 16 pages.
Examination Report for European Patent Application No. 21737171. 5, mailed Feb. 21, 2025, 6 pages.
ZTE, "R1-2102661: Multi-TRP Enhancements for PDCCH, PUCCH, and PUSCH," 3GPP TSG RAN WG1 Meeting #104b-e, Apr. 12-20, 2021, Electronic Meeting, 27 pages.
International Search Report and Written Opinion for International Patent Application No. PCT/IB2022/054403, mailed Aug. 18, 2022, 17 pages.
Written Opinion for International Patent Application No. PCT/IB2022/054403, mailed Mar. 23, 2023, 7 pages.
International Preliminary Report on Patentability for International Patent Application No. PCT/IB2022/054403, mailed Jul. 25, 2023, 25 pages.
Author Unknown, "Technical Specification Group Radio Access Network; NR; User Equipment (UE) radio transmission and reception; Part 1: Range 1 Standalone (Release 17)," Technical Specification 38.101-1, Version 17.1.0, Mar. 2021, 3GPP Organizational Partners, 513 pages.
Author Unknown, "Technical Specification Group Radio Access Network; NR; User Equipment (UE) radio transmission and reception; Part 2: Range 2 Standalone (Release 17)," Technical Specification 38.101-2, Version 17.1.0, Mar. 2021, 3GPP Organizational Partners, 189 pages.
Author Unknown, "Technical Specification Group Radio Access Network; NR; User Equipment (UE) radio transmission and reception; Part 3: Range 1 and Range 2 Interworking operatoin with other radios (Release 17)," Technical Specification 38.101-3, Version 17.1.0, Mar. 2021, 3GPP Organizational Partners, 716 pages.
Author Unknown, "Technical Specification Group Radio Access Network; NR; Physical layer procedures for control (Release 16)," Technical Specification 38.213, Version 16.4.0, Dec. 2020, 3GPP Organizational Partners, 181 pages.
Author Unknown, "Technical Specification Group Radio Access Network; NR; Physical layer procedures for control (Release 16)," Technical Specification 38.213, Version 16.5.0, Mar. 2021, 3GPP Organizational Partners, 183 pages.
Author Unknown, "Technical Specification Group Radio Access Network; NR; Medium Access Control (MAC) protocol specification (Release 16)," Technical Specification 38.321, Version 16.4.0, Mar. 2021, 3GPP Organizational Partners, 183 pages.
Author Unknown, "Technical Specification Group Radio Access Network; NR; Radio Resource Control (RRC) protocol specification (Release 16)," Technical Specification 38.331, Version 16.4.0, Mar. 2021, 3GPP Organizational Partners, 949 pages.
Author Unknown, "Technical Specification Group Radio Access Network; NR; Radio Resource Control (RRC) protocol specification (Release 16)," Technical Specification 38.331, Version 16.4.1, Mar. 2021, 3GPP Organizational Partners, 949 pages.

(56) References Cited

OTHER PUBLICATIONS

Ericsson, "R1-2103550: On PDCCH, PUCCH and PUSCH enhancements for multi-TRP," 3GPP TSG-RAN WG1 Meeting #104bis-e, Apr. 12-20, 2021, Electronic Meeting, 29 pages.
Nokia, et al., "R1-2103844: Summary #2 of Multi-TRP PUCCH and PUSCH," 3GPP TSG RAN WG1 #104bis-e, Apr. 12-20, 2021, Electronic Meeting, 129 pages.
Samsung, "R1-2103222: Enhancements on Multi-TRP for PDCCH, PUCCH and PUSCH," 3GPP TSG RAN WG1 #104b-e, Apr. 12-20, 2021, Electronic Meeting, 15 pages.
Author Unknown, "Technical Specification Group Radio Access Network; NR; Requirements for support of radio resource management (Release 17)," Technical Specification 38.133, Version 17.1.0, Mar. 2021, 2,172 pages.
Notice of Reasons for Refusal for Japanese Patent Application No. 2024-184242, mailed Jul. 11, 2025, 8 pages.
Second Office Action for Chinese Patent Application No. 202180052492.7, mailed Oct. 11, 2025, 15 pages.
Office Action for Colombian Patent Application No. NC2022/0018803, mailed Dec. 4, 2025, 58 pages.

\* cited by examiner

PUCCH-SPATIALRELATIONINFO INFORMATION ELEMENT

```
-- ASN1START
-- TAG-PUCCH-SPATIALRELATIONINFO-START

PUCCH-SpatialRelationInfo ::=   SEQUENCE {
    pucch-SpatialRelationInfoId     PUCCH-SpatialRelationInfoId,
    servingCellId                   ServCellIndex                                       OPTIONAL,   -- Need S
    referenceSignal                 CHOICE {
        ssb-Index                       SSB-Index,
        csi-RS-Index                    NZP-CSI-RS-ResourceId,
        srs                             PUCCH-SRS
    },
    pucch-PathlossReferenceRS-Id    PUCCH-PathlossReferenceRS-Id,
    p0-PUCCH-Id                     P0-PUCCH-Id,
    closedLoopIndex                 ENUMERATED { i0, i1 }
}

PUCCH-SpatialRelationInfo-r16 ::=   SEQUENCE {
    pucch-SpatialRelationInfoId-r16     PUCCH-SpatialRelationInfoId-r16,
    servingCellId-r16                   ServCellIndex                                   OPTIONAL,   -- Need S
    referenceSignal-r16                 CHOICE {
        ssb-Index                           SSB-Index,
        csi-RS-Index                        NZP-CSI-RS-ResourceId,
        srs                                 PUCCH-SRS
    },
    pucch-PathlossReferenceRS-Id-r16    PUCCH-PathlossReferenceRS-ID-r16,
    p0-PUCCH-Id-r16                     P0-PUCCH-Id,
    closedLoopIndex-r16                 ENUMERATED { i0, i1 }
}

PUCCH-SRS ::=   SEQUENCE {
    resource        SRS-ResourceId,
    uplinkBWP       BWP-Id
}

-- TAG-PUCCH-SPATIALRELATIONINFO-STOP
-- ASN1STOP
```

FIG. 4

```
SRS-SpatialRelationInfo ::=    SEQUENCE {
    servingCellID                  ServCellIndex
    referenceSignal                CHOICE {
        ssb-Index                      SSB-Index,
        csi-RS-Index                   NZP-CSI-RS-ResourceId,
        srs                            SEQUENCE {
            resourceId                     SRS-ResourceId,
            uplinkBWP                      BWP-Id
        }
    }                                                      OPTIONAL,   -- Need S
}
```

FIG. 5

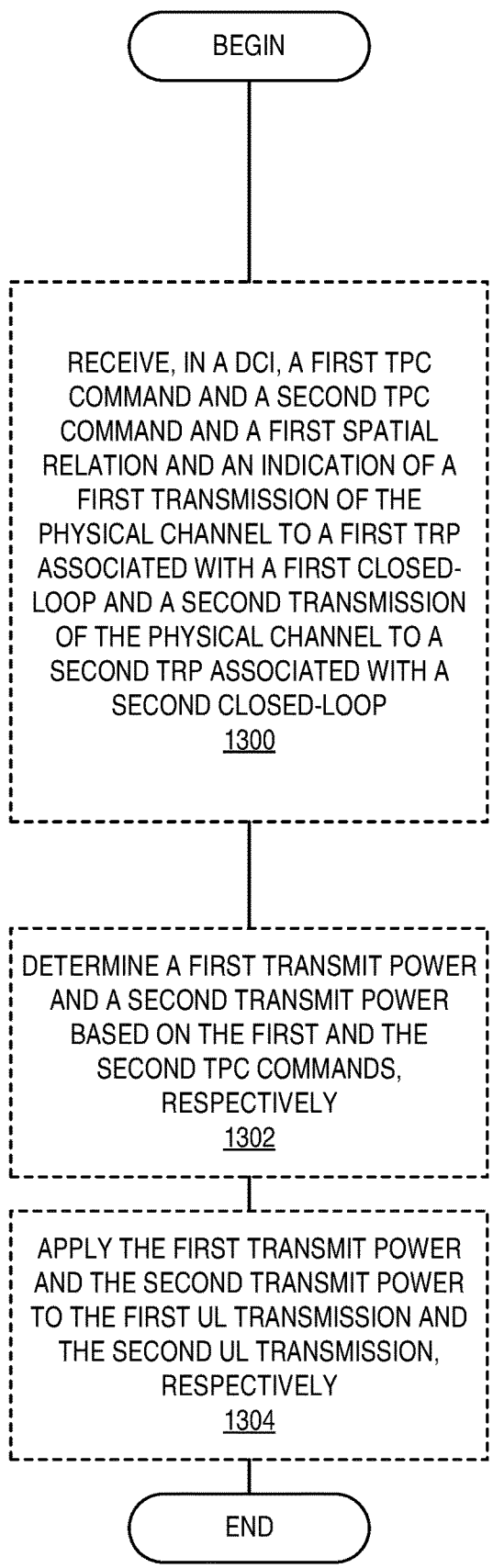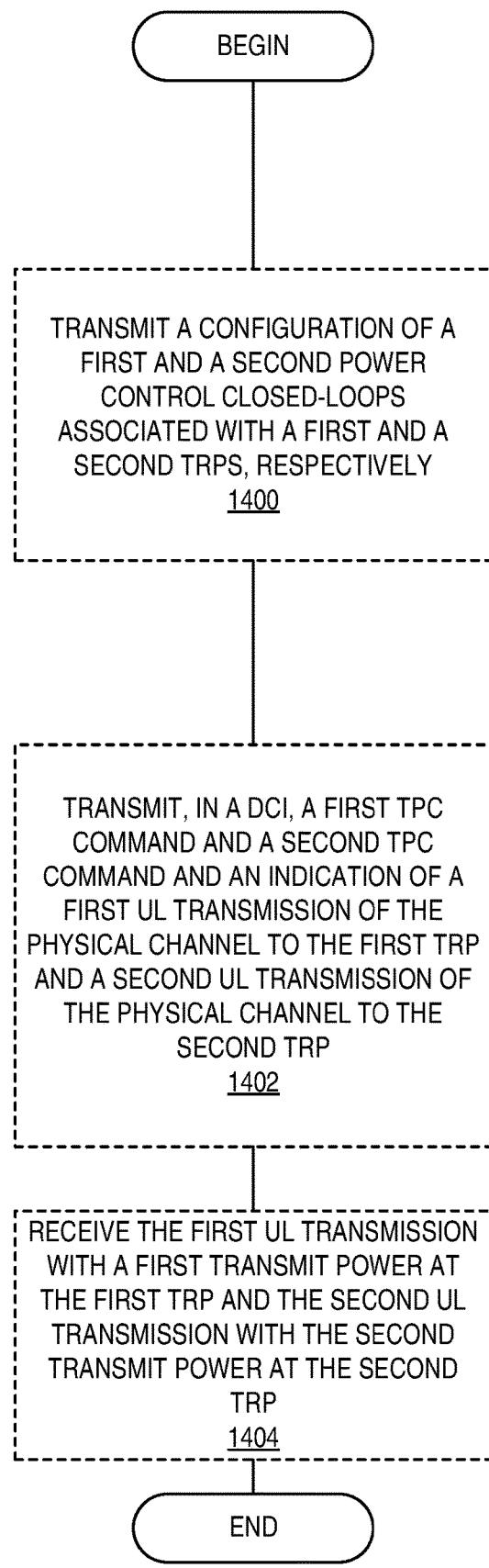
FIG. 13
FIG. 14

PUSCH-POWERCONTROL INFORMATION ELEMENT

```
-- ASN1START
-- TAG-PUSCH-POWERCONTROL-START

PUSCH-PowerControl ::=            SEQUENCE {
    tpc-Accumulation              ENUMERATED { disabled }                                          OPTIONAL,   -- Need S
    msg3-Alpha                    Alpha                                                            OPTIONAL,   -- Need S
    p0-NominalWithoutGrant        INTEGER (-202..24)                                               OPTIONAL,   -- Need M
    p0-AlphaSets                  SEQUENCE (SIZE (1..maxNrofP0-PUSCH-AlphaSets)) OF P0-PUSCH-AlphaSet        OPTIONAL,   -- Need M
    pathlossReferenceRSToAddModList  SEQUENCE (SIZE (1..maxNrofPUSCH-PathlossReferenceRSs)) OF PUSCH-PathlossReferenceRS    OPTIONAL,
- Need N
    pathlossReferenceRSToReleaseList  SEQUENCE (SIZE (1..maxNrofPUSCH-PathlossReferenceRSs)) OF PUSCH-PathlossReferenceRS-Id
    OPTIONAL,   -- Need N
    twoPUSCH-PC-AdjustmentStates  ENUMERATED {twoStates}                   OPTIONAL,   -- Need S
    xPUSCH-PC-AdjustmentStates    ENUMERATED {twoStates, fourStates}       OPTIONAL,   -- Need s
    deltaMCS                      ENUMERATED {enabled}                     OPTIONAL,   -- Need S
    sri-PUSCH-MappingToAddModList  SEQUENCE (SIZE (1..maxNrofSRI-PUSCH-Mappings)) OF SRI-PUSCH-PowerControl
OPTIONAL,   -- Need N
    sri-PUSCH-MappingToReleaseList  SEQUENCE (SIZE (1..maxNrofSRI-PUSCH-Mappings)) OF SRI-PUSCH-PowerControlId
    OPTIONAL    -- Need N
}

SRI-PUSCH-PowerControl ::=        SEQUENCE {
    sri-PUSCH-PowerControlId       SRI-PUSCH-PowerControlId,
    sri-PUSCH-PathlossReferenceRS-Id  PUSCH-PathlossReferenceRS-Id,
    sri-P0-PUSCH-AlphaSetId        P0-PUSCH-AlphaSetId,
    sri-PUSCH-ClosedLoopIndex      ENUMERATED { i0, i1, i2, i3 }
}
```

FIG. 15

PUCCH-POWERCONTROL INFORMATION ELEMENT

```
-- ASN1START
-- TAG-PUCCH-POWERCONTROL-START
PUCCH-PowerControl ::=          SEQUENCE {
    deltaF-PUCCH-f0         INTEGER (-16..15)       OPTIONAL,  -- Need R
    deltaF-PUCCH-f1         INTEGER (-16..15)       OPTIONAL,  -- Need R
    deltaF-PUCCH-f2         INTEGER (-16..15)       OPTIONAL,  -- Need R
    deltaF-PUCCH-f3         INTEGER (-16..15)       OPTIONAL,  -- Need R
    deltaF-PUCCH-f4         INTEGER (-16..15)       OPTIONAL,  -- Need R
    p0-Set                  SEQUENCE (SIZE (1..maxNrofPUCCH-P0-PerSet)) OF P0-PUCCH OPTIONAL,  -- Need M
    pathlossReferenceRSs    SEQUENCE (SIZE (1..maxNrofPUCCH-PathlossReferenceRSs)) OF PUCCH-PathlossReferenceRS
OPTIONAL,  -- Need M twoPUCCH-PC-AdjustmentStates    ENUMERATED {twoStates}   OPTIONAL,  -- Need S
    xPUCCH-PC-AdjustmentStates      ENUMERATED {twoStates, fourStates}  OPTIONAL,  -- Need S
    ...
}
                                        (A)

PUCCH-SpatialRelationInfo ::=  SEQUENCE {
    pucch-SpatialRelationInfoId   PUCCH-SpatialRelationInfoId,
    servingCellId                 ServCellIndex                     OPTIONAL,  -- Need S
    referenceSignal               CHOICE {
        ssb-Index                     SSB-Index,
        csi-RS-Index                  NZP-CSI-RS-ResourceId,
        srs                           PUCCH-SRS
    },
    pucch-PathlossReferenceRS-Id  PUCCH-PathlossReferenceRS-Id,
    p0-PUCCH-Id                   P0-PUCCH-Id,
    closedLoopIndex               ENUMERATED { i0, i1, i2, i3 }
}
                                        (B)
```

FIG. 16

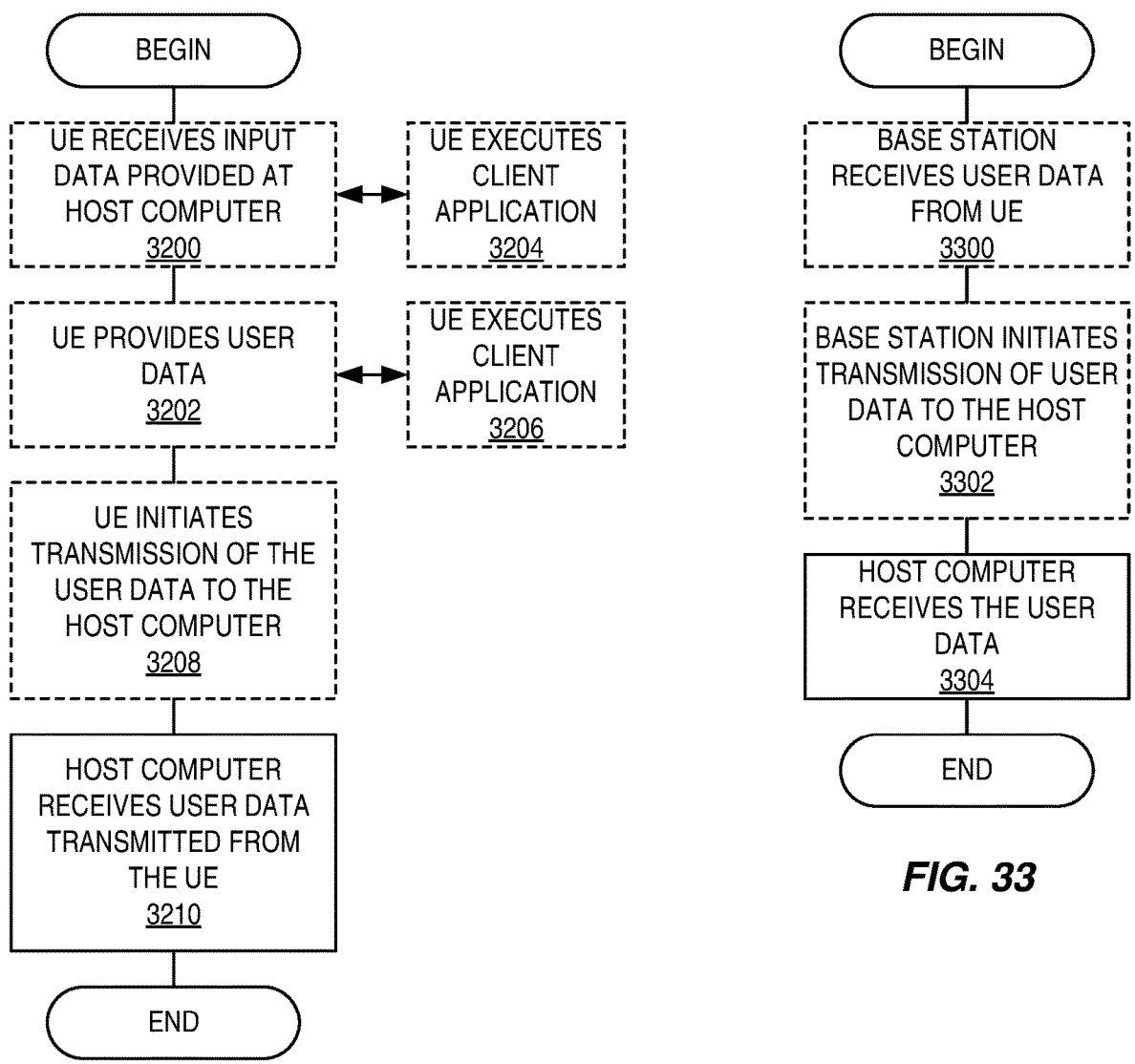

POWER CONTROL FOR UPLINK TRANSMISSIONS TOWARDS MULTIPLE TRPS

RELATED APPLICATIONS

This application is a 35 U.S.C. § 371 national phase filing of International Application No. PCT/IB2021/055717, filed Jun. 25, 2021, which claims the benefit of provisional patent application Ser. No. 63/044,851, filed Jun. 26, 2020, the disclosures of which are hereby incorporated herein by reference in their entireties.

TECHNICAL FIELD

The present disclosure relates to power control of multiple Transmission Reception Points (TRPs).

BACKGROUND

The next generation mobile wireless communication system (5G) or New Radio (NR) will support a diverse set of use cases and a diverse set of deployment scenarios. The latter includes deployment at both low frequencies (below 6 GHZ) and very high frequencies (up to 10's of GHz).

NR Frame Structure and Resource Grid: NR uses CP-OFDM (Cyclic Prefix Orthogonal Frequency Division Multiplexing) in both Downlink (DL) (i.e., from a network node, gNB, or base station, to a user equipment or UE) and Uplink (UL) (i.e., from UE to gNB). Discrete Fourier Transform (DFT) spread OFDM is also supported in the uplink. In the time domain, NR downlink and uplink are organized into equally sized subframes of 1 ms each. A subframe is further divided into multiple slots of equal duration. The slot length depends on subcarrier spacing. For subcarrier spacing of $\Delta f=15$ kHz, there is only one slot per subframe, and each slot consists of 14 OFDM symbols.

Data scheduling in NR is typically in slot basis, an example is shown in FIG. 1 with a 14-symbol slot, where the first two symbols contain Physical Downlink Control Channel (PDCCH) and the rest contains physical shared data channel, either PDSCH (Physical Downlink Shared Channel) or PUSCH (Physical Uplink Shared Channel).

Different subcarrier spacing values are supported in NR. The supported subcarrier spacing values (also referred to as different numerologies) are given by $\Delta f=(15 \times 2^\mu)$ kHz where $\mu \in \{0,1,2,3,4\}$. $\Delta f=15$ kHz is the basic subcarrier spacing. The slot duration in milliseconds (ms) for a subcarrier spacing configuration $\mu$ is given by $1/2^\mu$ ms.

In the frequency domain, a system bandwidth is divided into resource blocks (RBs), each corresponds to 12 contiguous subcarriers. The Resource Blocks (RBs) are numbered starting with 0 from one end of the system bandwidth. The basic NR physical time-frequency resource grid is illustrated in FIG. 2, where only one Resource Block (RB) within a 14-symbol slot is shown. One OFDM subcarrier during one OFDM symbol interval forms one Resource Element (RE).

Downlink (DL) PDSCH transmissions can be either dynamically scheduled, i.e., in each slot the gNB transmits Downlink Control Information (DCI) over the PDCCH (Physical Downlink Control Channel) about which UE data is to be transmitted to and which RBs the data is transmitted on, or Semi-Persistently Scheduled (SPS) in which periodic PDSCH transmissions are activated or deactivated by a DCI. Different DCI formats are defined in NR for DL PDSCH scheduling including DCI format 1_0, DCI format 1_1, and DCI format 1_2.

Similarly, uplink (UL) PUSCH transmission can also be scheduled either dynamically with uplink grants in DCI carried in PDCCH or semi-persistently. NR supports two types of semi-persistent uplink transmission, i.e., type 1 configured grant (CG) and type 2 configured grant, where Type 1 configured grant is configured and activated by Radio Resource Control (RRC) while type 2 configured grant is configured by RRC but activated/deactivated by DCI. The DCI formats for scheduling PUSCH include DCI format 0_0, DCI format 0_1, and DCI format 0_2.

Transmission with multiple beams: In NR Frequency Range 2 (FR2), multiple radio frequency (RF) beams may be used to transmit and receive signals at a gNB and a UE. For each DL beam from a gNB, there is typically an associated best UE receive (Rx) beam for receiving signals from the DL beam. The DL beam and the associated UE Rx beam forms a beam pair. The beam pair can be identified through a so-called beam management process in NR.

A DL beam is identified by an associated DL reference signal (RS) transmitted in the beam, either periodically, semi-persistently, or aperiodic. The DL RS for the purpose can be a Synchronization Signal (SS) and Physical Broadcast Channel (PBCH) block (SSB) or a Channel State Information RS (CSI-RS). For each DL RS, a UE can do a Rx beam sweep to determine the best Rx beam associate with the DL beam. The best Rx beam for each DL RS is then memorized by the UE. By measuring all the DL RSs, the UE can determine and report to the gNB the best DL beam to use for DL transmissions.

With the reciprocity principle, the same beam pair can also be used in the UL to transmit a UL signal to the gNB, often referred to as beam correspondence.

An example is shown in FIG. 3, where a gNB consists of a transmission point (TRP) with two DL beams each associated with a CSI-RS. Each of the DL beams is associated with a best UE Rx beam, i.e., Rx beam #1 is associated with the DL beam with CSI-RS #1 and Rx beam #2 is associated with the DL beam with CSI-RS #2.

Due to UE movement or environment change, the best DL beam for a UE may change over time and different DL beams may be used in different times. The DL beam used for a DL data transmission in PDSCH can be indicated by a Transmission Configuration Indicator (TCI) field in the corresponding DCI scheduling the PDSCH or activating the PDSCH in case of SPS. The TCI field indicates a TCI state which contains a DL RS associated with the DL beam. In the DCI, a PUCCH resource is indicated for carrying the corresponding Hybrid Automatic Repeat Request (HARQ) Acknowledgment, i.e., ACK or NACK (A/N). The UL beam for carrying the PUCCH is determined by a PUCCH spatial relation activated for the PUCCH resource. For PUSCH transmission, the UL beam is indicated indirectly by a sounding reference signal (SRS) resource indicator (SRI), which points to one or more SRS resources associated with the PUSCH transmission. The SRS resource(s) can be periodic, semi-persistent, or aperiodic. Each SRS resource is associated with an SRS spatial relation in which a DL RS (or another periodic SRS) is specified. The UL beam for the PUSCH is implicitly indicated by the SRS spatial relation(s).

Spatial Relations

Spatial relation is used in NR to refer to a spatial relationship between an UL channel or signal, such as PUCCH, PUSCH or SRS, and a DL (or UL) reference signal (RS), such as CSI-RS, SSB, or SRS. If an UL channel or signal is spatially related to a DL RS, it means that the UE should transmit the UL channel or signal with the same beam used in receiving the DL RS previously. More precisely, the UE should transmit the UL channel or signal with the same spatial domain transmission filter used for the reception of the DL RS.

If a UL channel or signal is spatially related to a UL SRS, then the UE should apply the same spatial domain transmission filter for the transmission for the UL channel or signal as the one used to transmit the SRS.

For PUCCH, up to 64 spatial relations can be configured for a UE and one of the spatial relations is activated by a Medium Access Control (MAC) Control Element (CE) for each PUCCH resource.

FIG. 4 is a PUCCH spatial relation information element (IE) that a UE can be configured in NR, it includes one of a SSB index, a CSI-RS resource identity (ID), and SRS resource ID as well as some power control parameters such as pathloss RS, closed-loop index, etc.

For each periodic and semi-persistent SRS resource or aperiodic SRS with usage "non-codebook" configured, its associated DL CSI-RS is RRC configured. For each aperiodic SRS resource with usage "codebook" configured, the associated DL RS is specified in an SRS spatial relation activated by a MAC CE. An example is shown in FIG. 5, where one of a SSB index, a CSI-RS resource identity (ID), and SRS resource ID is configured.

For PUSCH, its spatial relation is defined by the spatial relation of the corresponding SRS resource(s) indicated by the SRI in the corresponding DCI.

Uplink power control in NR: Uplink power control is used to determine a proper transmit power for PUSCH, PUCCH or SRS to ensure that they are received by the gNB at an appropriate signal level. The transmit power will depend on the amount of channel attenuation over the propagation path, the noise and interference level experience at the gNB receiver, and the data rate in case of PUSCH or PUCCH.

The uplink power control in NR consists of two parts, i.e., open-loop power control and closed-loop power control. Open-loop power control is used to set the uplink transmit power based on the pathloss estimation and some other factors including the target receive power, channel/signal bandwidth, Modulation and Coding Scheme (MCS), fractional power control factor, etc.

Closed-loop power control is based on explicit power control commands received from the gNB. The power control commands are typically determined based on some UL measurements at the gNB on the actual received signal level. The power control commands may contain the difference between the actual and the target received signal levels. Either cumulative or non-cumulative closed-loop power adjustments are supported in NR. Up to two closed loops can be configured in NR for each UL channel or signal. A closed loop power adjustment at a given time is also referred as a power control adjustment state.

With multi-beam transmission in FR2, pathloss estimation needs to also reflect the beamforming gains corresponding to an uplink transmit and receive beam pair used for the UL channel or signal. This is achieved by estimating the pathloss based on measurements on a downlink RS transmitted over the corresponding downlink beam pair. The DL RS for this purpose is referred to as a DL pathloss RS. A DL pathloss RS can be a CSI-RS or SSB. For the example shown in FIG. 3, when a UL signal is transmitted in beam #1, CSI-RS #1 may be configured as the pathloss RS. Similarly, if a UL signal is transmitted in beam #2, CSI-RS #2 may be configured as the pathloss RS.

For a UL channel or signal (e.g., PUSCH, PUCCH, or SRS) to be transmitted in a UL beam pair associated with a pathloss RS with index k, its transmit power in a transmission occasion i within a slot in a bandwidth part (BWP) of a carrier frequency of a serving cell and a closed-loop index l (l=0,1) can be expressed as:

$$P(i, k, l) = \min\left\{\begin{array}{l} P_{CMAX}(i) \\ P_{open-loop}(i, k) + P_{closed-loop}(i, l) \end{array}\right.$$

where $P_{CMAX}(i)$ is the configured UE maximum output power for the carrier frequency of the serving cell in transmission occasion i for the UL channel or signal. $P_{open-loop}(i, k)$ is the open loop power adjustment and $P_{closed-loop}(i, l)$ is the closed loop power adjustment. $P_{open-loop}(i, k)$ is given below:

$$P_{open-loop}(i,k) = P_O + P_{RB}(i) + \alpha \cdot PL(k) + \Delta(i)$$

where $P_O$ is the nominal target receive power for the UL channel or signal and comprises a cell specific part $P_{O,cell}$ and a UE specific part $P_{O,UE}$; $P_{RB}(i)$ is a power adjustment related to the number of RBs occupied by the channel or signal in transmission occasion i, $P_L(k)$ is the pathloss estimation based on a pathloss RS with index k, $\alpha$ is a fractional pathloss compensation factor, and $\Delta(i)$ is a power adjustment related to MCS. $P_{closed-loop}(i, l)$ is given below:

$$P_{closed-loop}(i, l) = \\ \begin{cases} P_{closed-loop}(i - i_0, l) + \sum_{m=0}^{M} \delta(m, l); \text{ if cumulation is enabled} \\ \delta(i, l); \text{ if cumulation is disabled (i.e., absolute is enable)} \end{cases}$$

where $\delta(i, l)$ is a Transmit Power Control (TPC) command value included in a DCI format associated with the UL channel or signal at transmission occasion i and closed-loop l; $\sum_{m=0}^{M}\delta(m, l)$ is a sum of TPC command values that the UE receives for the channel or signal and the associated closed-loop l since the TPC command for transmission occasion i–i_0.

Note that power control parameters $P_O$, $P_{RB}(i)$, $\alpha$, PL, $\Delta(i)$, $\delta(i, l)$ are generally configured separately for each UL channel or signal (e.g., PUSCH, PUCCH, and SRS) and may be different for different UL channels or signals.

Power control for SRS: For SRS, pathloss RS and other power control parameters (e.g., $P_O$, $\alpha$, etc.) are configured for each SRS resource set. In NR Rel-16, a list of pathloss RS may be configured for an SRS resource set and one pathloss RS is activated/selected by a Medium Access Control (MAC) Control Element (CE). Note that for each Bandwidth Part (BWP) in a serving cell, there can only be one SRS resource set configured with usage set to either "codebook" or "non-codebook" in NR.

For SRS closed-loop power control, a UE can have a dedicated closed loop for SRS or use the closed loop(s) of PUSCH in the same serving cell. This is configured by a higher layer parameter srs-PowerControlAdjustmentStates in each SRS resource set to select one out of three options, i.e., the dedicated closed loop for SRS, the first closed loop for PUSCH, and the second closed loop for PUSCH. In case that the closed loop(s) are shared with PUSCH, $P_{closed-loop}(i, l)$ for PUSCH also applies to SRS transmitted in the SRS resource set.

For the dedicated closed loop configured for SRS, $\delta(m, l)$ corresponds to a TPC command received in DCI format 2_3 for the UE. The mapping between the two bits TPC command field in DCI and power adjustment values in dB are shown in Table 1.

Default pathloss RS: If pathloss RS is not configured in a SRS resource set, and SRS_SpatialRelationInfo is not configured in a SRS resource, but the UE is configured with enableDefaultBeamPlForSRS, then the pathloss RS is a periodic RS resource with Quasi Co-Located ('QCL)-TypeD' in the TCI state of a Control Resource Set (CORESET) with the lowest index, if CORESETs are configured in the active DL BWP, or in the active PDSCH TCI state with lowest ID, if CORESETs are not configured in the active DL BWP.

Power control for PUSCH: For PUSCH, $P_O = P_{O,nominal\_PUSCH} + P_{O,UE\_PUSCH}$, where $P_{O,nominal\_PUSCH}$ is cell specific and is RRC configured, and $P_{O,UE\_PUSCH}$ is UE specific and can be dynamically selected. For dynamically scheduled PUSCH, as illustrated in FIG. 6, a UE is configured by RRC with a list of P0-PUSCH-Alpha sets and a list of SRI-PUSCH-PowerControl information elements. One SRI-PUSCH-PowerControl is selected by the SRI field in DCI (e.g., DCI formats 0_1, 0_2). Each SRI-PUSCH-PowerControl IE consists of a PUSCH pathloss RS ID, a closed-loop index, and a P0-PUSCH-AlphaSet ID, where a P0-PUSCH-AlphaSet comprises a $P_{O,UE\_PUSCH}$ and α. δ(i, l) is indicated in a 2 bits TPC command field of the same DCI, where the mapping between the field value and the dB value is shown in Table 1.

In NR Rel-16, additional one or two sets of P0-PUSCH-r16 can be configured for each SRI for Ultra Reliable Low Latency Communication (URLLC) traffic. One set can be configured if SRI is present in UL DCI format 0_1 or DCI format 0_2 and whether the P0 associated with the SRI or the set of P0 configured for URLLC should be used for a PUSCH can be dynamically indicated in a "Open-loop power control parameter set indication" field in UL DCI. Two sets can be configured if SRI is not present in UL DCI and one of the two P0-PUSCH-r16 sets and the first P0-PUSCH-AlphaSet can be dynamically indicated in the "Open-loop power control parameter set indication" field in UL DCI.

If the PUSCH transmission is scheduled by a DCI format that does not include a SRI field, or if SRI-PUSCHPower-Control is not provided to the UE, the UE determines $P_{O,UE\_PUSCH}$ and a from the value of the first P0-PUSCH-AlphaSet.

In addition to TPC command field in DCI scheduling a PUSCH, PUSCH power control for a group of UEs is also supported by DCI format 2_2 with CRC scrambled by TPC-PUSCH-Radio Network Temporary Identifier (RNTI), in which power adjustments for multiple UEs can be signaled simultaneously.

TABLE 1

Mapping of TPC Command Field in DCI formats
0_0, 0_1, 0_2, 2_2 for PUSCH or DCI format 2_3
for SRS to absolute and accumulated values.

| TPC Command Field | Accumulated δ(m, l) [dB] | Absolute δ(m, l) [dB] |
| --- | --- | --- |
| 0 | −1 | −4 |
| 1 | 0 | −1 |
| 2 | 1 | 1 |
| 3 | 3 | 4 |

For PUSCH with configured grant, $P_O$, α and closed loop index are semi-statically configured by RRC. For Configured Grant (CG) with RRC configured pathloss RS, the RS is used for pathloss estimation, otherwise, the pathloss RS indicated in the DCI activating the CG PUSCH is used for pathloss estimation.

Default pathloss RS: If the PUSCH transmission is scheduled by a DCI format 0_0, and if the UE is configured with PUCCH-SpatialRelationInfo for a PUCCH resource with a lowest index in the BWP of the serving cell, the UE uses the same pathloss RS resource for PUSCH as for a PUCCH transmission in the PUCCH resource with the lowest index.

If SRI field is not present in a DCI format 0_1 or DCI format 0_2 scheduling a PUSCH, or SRI-PUSCH-Power-Control is not provided to the UE, or a PUSCH scheduled by DCI format 0_0 and PUCCH-SpatialRelationInfo is not configured, the pathloss RS is the one contained in the PUSCH-PathlossReferenceRS-Id with the lowest index value.

If the PUSCH transmission is scheduled by a DCI format 0_0, and if the UE is not configured with PUCCH-SpatialRelationInfo for a PUCCH resource, and if the UE is configured with enableDefaultBeamPlForPUSCH0_0, the UE in the BWP of the serving cell, the pathloss RS is then a periodic RS resource with 'QCL-TypeD' in a TCI state or QCL assumption of a CORESET with the lowest index in the active DL BWP of the primary cell.

Power control for PUCCH: For PUCCH, $P_O = P_{O,nominal\_PUCCH} + P_{O,UE\_PUCCH}$ and α=1, where $P_{O,nominal\_PUCCH}$ is RRC configured cell specific parameter and $P_{O,UE\_PUCCH}$ IS a UE specific parameter and can vary among different PUCCH resources. A UE is configured with a list of up to 8 $P_{O,UE\_PUCCH}$ (each with a P0-PUCCH-Id) and a list of up to eight pathloss RS (each with a PUCCH-PathlossReferenceRS-Id). For each PUCCH resource, a PUCCH spatial relation (i.e., PUCCH-SpatialRelationInfo) is activated in which a closed-loop index, a pathloss RS (from the corresponding list), and a $P_{O,UE\_PUCCH}$ (from the corresponding list) are configured.

For closed loop power adjustment for PUCCH, up to two control loops may be configured. Accumulation is always enabled. TPC command for PUCCH HARQ A/N can be received in either DCI formats 1_0, 1_1 and 1_2 scheduling the corresponding PDSCH or in DCI format 2_2 when the DCI is scrambled with TPC-PUCCH-Radio Network Temporary Identifier (RNTI). The mapping between a TPC field value in DCI and a power correction value in dB is shown in Table 2.

TABLE 2

Mapping of TPC Command Field in DCI format
1_0 or DCI format 1_1 or DCI format 1_2 or DCI
format 2_2 to accumulated δ(m, l) values for PUCCH:

| TPC Command Field | Accumulated δ(m, l) [dB] |
| --- | --- |
| 0 | −1 |
| 1 | 0 |
| 2 | 1 |
| 3 | 3 |

Default Pathloss RS: If PUCCH spatial relation is not configured but a list of pathloss RS is configured for PUCCH, then the pathloss RS in the first one in the list is used.

If both the list of pathloss RS and PUCCH-SpatialRelationInfo are not configured, but the UE is configured with enableDefaultBeamPlForPUCCH, then the pathloss RS is a periodic RS resource with 'QCL-TypeD' in the TCI state of a CORESET with the lowest index in the active DL BWP of the primary cell.

UL Transmission to Multiple Transmission Points (TRPs): PDSCH transmission with multiple transmission points has been introduced in 3GPP for NR Rel-16, in which a transport block may be transmitted over multiple TRPs to improve transmission reliability.

In NR Rel-17, it has been proposed to introduce UL enhancement with multiple TRPs by transmitting a PUCCH or PUSCH towards different TRPs as shown in FIG. 7, either simultaneously or in different times.

In one scenario, multiple PUCCH/PUSCH transmissions each towards a different TRP may be scheduled by a single DCI. For example, multiple spatial relations may be activated for a PUCCH resource and the PUCCH resource may be signaled in a DCI scheduling a PDSCH. The HARQ A/N associated with the PDSCH is then carried by the PUCCH which is then repeated multiple times either within a slot or over multiple slots, each repetition is towards a different TRP. An example is shown in FIG. 8, where a PDSCH is scheduled by a DCI and the corresponding HARQ A/N is sent in a PUCCH which is repeated twice in time, one towards TRP #1 and the other towards TRP #2. Each TRP is associated with a PUCCH spatial relation.

An example of PUSCH repetitions is shown in FIG. 9, where two PUSCH repetitions for a same TB are scheduled by a single DCI, each PUSCH occasion is towards a different TRP. Each TRP is associated with an SRI or a UL TCI state signaled in the UL DCI.

DL TCI states: Several signals can be transmitted from different antenna ports of a same base station. These signals can have the same large-scale properties such as Doppler shift/spread, average delay spread, or average delay. These antenna ports are then said to be Quasi Co-Located (QCL).

If the UE knows that two antenna ports are QCL with respect to a certain parameter (e.g., Doppler spread), the UE can estimate that parameter based on one of the antenna ports and apply that estimate for receiving signal on the other antenna port.

For example, the TCI state may indicate a QCL relation between a CSI-RS for Tracking RS (TRS) and the PDSCH Demodulation Reference Signal (DMRS). When UE receives the PDSCH DMRS it can use the measurements already made on the TRS to assist the DMRS reception.

Information about what assumptions can be made regarding QCL is signaled to the UE from the network. In NR, four types of QCL relations between a transmitted source RS and transmitted target RS were defined:

Type A: {Doppler shift, Doppler spread, average delay, delay spread}
Type B: {Doppler shift, Doppler spread}
Type C: {average delay, Doppler shift}
Type D: {Spatial Rx parameter}

For dynamic beam and transmission point (TRP) indication, a UE can be configured through RRC signaling with up to 128 Transmission Configuration Indicator (TCI) states for PDSCH in FR2 and up to 8 in Frequency Range 1 (FR1), depending on UE capability. Each TCI state contains QCL information, i.e., one or two DL RSs, each RS associated with a QCL type. The TCI states can be interpreted as a list of possible DL beams/TRPs for PDSCH transmissions to the UE.

For PDSCH transmission, up to eight TCI states or pair of TCI states may be activated and a UE may be dynamically indicated by a TCI codepoint in DCI one or two of the activated TCI states for PDSCH reception. The UE shall use the TCI-State according to the value of the 'Transmission Configuration Indication' field in the detected PDCCH with DCI for determining PDSCH antenna port quasi co-location.

UL TCI states: The existing way of using spatial relation for UL beam indication in NR is cumbersome and inflexible. To facilitate UL beam selection for UEs equipped with multiple panels, a unified TCI framework for UL fast panel selection is to be evaluated and introduced in NR Rel-17. Similar to DL, where TCI states are used to indicate DL beams/TRPs, TCI states may also be used to select UL panels and beams used for UL transmissions (i.e., PUSCH, PUCCH, and SRS).

It is envisioned that UL TCI states are configured by higher layers (i.e., RRC) for a UE in number of possible ways. In one scenario, UL TCI states are configured separately from the DL TCI states and each uplink TCI state may contain a DL RS (e.g., NZP CSI-RS or SSB) or an UL RS (e.g., SRS) to indicate a spatial relation. The UL TCI states can be configured either per UL channel/signal or per BWP such that the same UL TCI states can be used for PUSCH, PUCCH, and SRS. Alternatively, a same list of TCI states may be used for both DL and UL, hence a UE is configured with a single list of TCI states for both UL and DL beam indication. The single list of TCI states in this case can be configured either per UL channel/signal or per BWP information elements.

Power Head Room Reporting: The uplink power availability at a UE, or Power Headroom (PHR), needs to be provided to the gNB. PHR reports are transmitted from the UE to the gNB when the UE is scheduled to transmit data on PUSCH. A PHR report can be triggered periodically or when certain conditions are met such as when the difference between the current PHR and the last report is larger than a configurable threshold.

There are two different types of power-headroom reports defined in NR, i.e., Type 1 and Type 3. Type 1 power headroom reporting reflects the power headroom assuming PUSCH-only transmission on a carrier. PHR is a measure of the difference between $P_{CMAX}$ and the transmit power that would have been used for a PUSCH. A negative PHR indicates that the per-carrier transmit power is limited by $P_{CMAX}$ at the time of the power headroom reporting for the PUSCH.

The type 1 PHR can be based on either an actual PUSCH transmission carrying the PHR report or a reference PUSCH transmission (aka, virtual PHR) if the time between a PHR report trigger and the corresponding PUSCH carrying the PHR report is too short for a UE to complete the PHR calculation based the actual PUSCH. The power control parameters for the reference PUSCH are pre-determined.

Type 3 power headroom reporting is used for UL carrier switching in which a PHR is reported for a carrier that is not yet configured for PUSCH transmission but is configured only for SRS transmission. Similarly, a type 3 PHR can be based on either an actual SRS transmission or a reference SRS transmission.

Improved systems and methods for power control of multiple TRPs are needed.

SUMMARY

Systems and methods for enabling power control of multiple Transmission Reception Points (TRPs) are provided. A method is proposed to include multiple PUCCH TPC commands in a DL DCI triggering multiple PUCCH transmissions towards multiple TRPs, each of the TPC commands is associated with one of the TRPs. The number of TPC commands in the DCI is the same as the number of TCI states indicated in the DCI. The number of TPC command fields in the DCI is determined by the maximum number of spatial relations (or UL TCI states) activated for all PUCCH resources configured in the corresponding BWP of a UL carrier.

Similarly, a method is proposed to include multiple PUSCH TPC commands in a UL DCI scheduling multiple PUSCH transmissions towards multiple TRPs. The number of TPC commands in the DCI is the same as the number of SRIs (or UL TCI states) indicated in the DCI. The number of TPC command fields in the DCI is determined by the maximum number of SRIs (or UL TCI states) associated with PUSCH transmissions configured in the corresponding BWP of a UL carrier.

Closed loops associated with different TRPs are jointly indexed such that for group based TPC commands in DCI format 2_2 and/or DCI format 2_3, each block for a UE can include one or more TPC commands and the associated closed loop indicators. The number of bits for the closed loop indicator is based on the maximum number of closed loops configured for the corresponding PUSCH, PUCCH, or SRS.

When a PHR report is based on actual PUSCH and is carried on a PUSCH which is repeated towards multiple TRPs, multiple PHRs may be calculated, each based one PUSCH occasion to a TRP. One of the minimum, maximum, or the average of the multiple PHRs may be reported.

There are, proposed herein, various embodiments which address one or more of the issues disclosed herein:

In some embodiments, methods of uplink transmit power control in a wireless network comprising at least a network node comprising multiple transmission and reception points (TRPs) identified by spatial relations or SRIs and a user equipment. The method comprises: Receiving in a DCI a first and a second TPC commands and a first and a second spatial relations for a first and a second UL transmissions, respectively; Estimating a first and a second transmit powers based on respectively the first and the second spatial relations; and/or applying the first and the second transmit powers to the first and the second UL transmissions, respectively.

In some embodiments, the first and the second spatial relations are associated with a first and a second DL or UL reference signals. In some embodiments, the first and the second DL or UL reference signals are one of a CSI-RS, SSB, or SRS.

In some embodiments, the first and the second DL or UL reference signals are different. In some embodiments, the DCI is a DL DCI of one of DCI format 1_1 or DCI format 1_2. In some embodiments, the first and the second UL transmissions are respectively a first and a second PUCCH transmissions.

In some embodiments, the first and the second spatial relations are associated with a single PUCCH resource. In some embodiments, the DCI is a UL DCI of one of DCI format 0_1 or DCI format 0_2.

In some embodiments, the first and the second UL transmissions are respectively a first and a second PUSCH transmissions. In some embodiments, the first and the second spatial relations are associated with respectively a first and a second SRIs indicated in the DCI.

In some embodiments, the method further comprises calculating a first and a second PHRs based on the first and the second transmit powers, respectively, and reporting one of the first PHR, the second PHR, the maximum of the first and the second PHRs, and the minimum of the first and the second PHRs in a PHR report in the first and the second PUSCH transmissions.

In some embodiments, the first and the second spatial relations are associated with respectively a first and a second UL TCI states indicated in the DCI. In some embodiments, the first and the second spatial relations are associated with a first and a second sets of power control parameters, respectively.

In some embodiments, the estimating the first and the second transmit powers comprises calculating a first and a second open loop power adjustments based on respectively the first and the second set of power control parameters, and a first and a second closed loop power adjustments based on respectively the first and the second TPC commands.

In some embodiments, the first and the second spatial relations are associated with a first and a second TRP, respectively. In some embodiments, the first and a second TPC commands are jointly encoded.

Certain embodiments may provide one or more of the following technical advantages. The solutions enable more accurate per TRP power control with a simple signaling for multiple UL transmissions towards different TRPs scheduled by a single DCI.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 4 is a PUCCH spatial relation information element (IE) that a UE can be configured in NR, it includes one of a Synchronization Signal Block (SSB) index, a CSI-RS resource identity (ID), and Sounding Reference Signal (SRS) resource ID as well as some power control parameters such as pathloss RS, closed-loop index, etc.;

FIG. 5 illustrates an example where one of a SSB index, a CSI-RS resource identity (ID), and SRS resource ID is configured, according to some embodiments of the present disclosure;

FIG. 13 illustrates a method performed by a wireless device for enabling power control of multiple TRPs, according to some embodiments of the present disclosure;

FIG. 14 illustrates a method performed by a base station for enabling power control of multiple TRPs, according to some embodiments of the present disclosure;

FIG. 15 illustrates an example showing configuration of more than two closed loop indices for PUSCH, according to some embodiments of the present disclosure;

FIG. 16 illustrates an example showing configuration of more than two closed loop indices for PUCCH, according to some embodiments of the present disclosure;

FIGS. 30-33 are flowcharts illustrating methods implemented in a communication system, according to some embodiments of the present disclosure.

DETAILED DESCRIPTION

Figure 1:
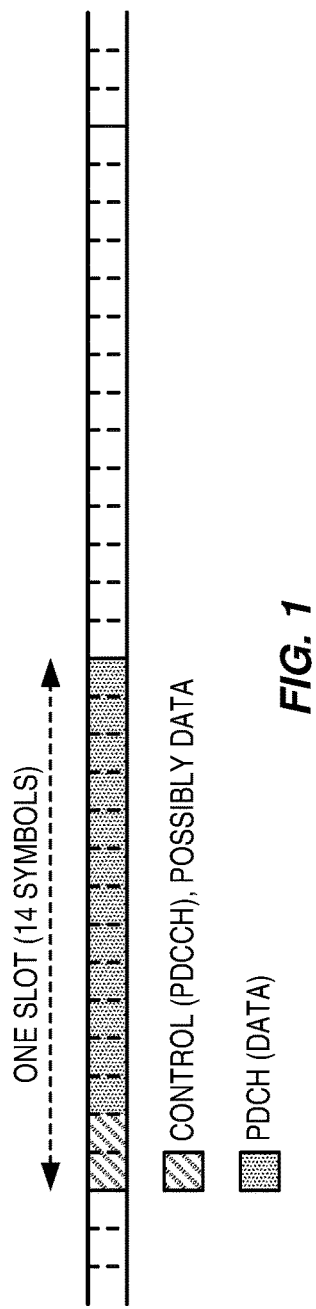
FIG. 1 illustrates data scheduling in New Radio (NR) which is typically in slot basis, where the first two symbols contain physical downlink control channel (PDCCH) and the rest contains physical shared data channel, either PDSCH (Physical Downlink Shared Channel) or PUSCH (Physical Uplink Shared Channel)
Figure 2:
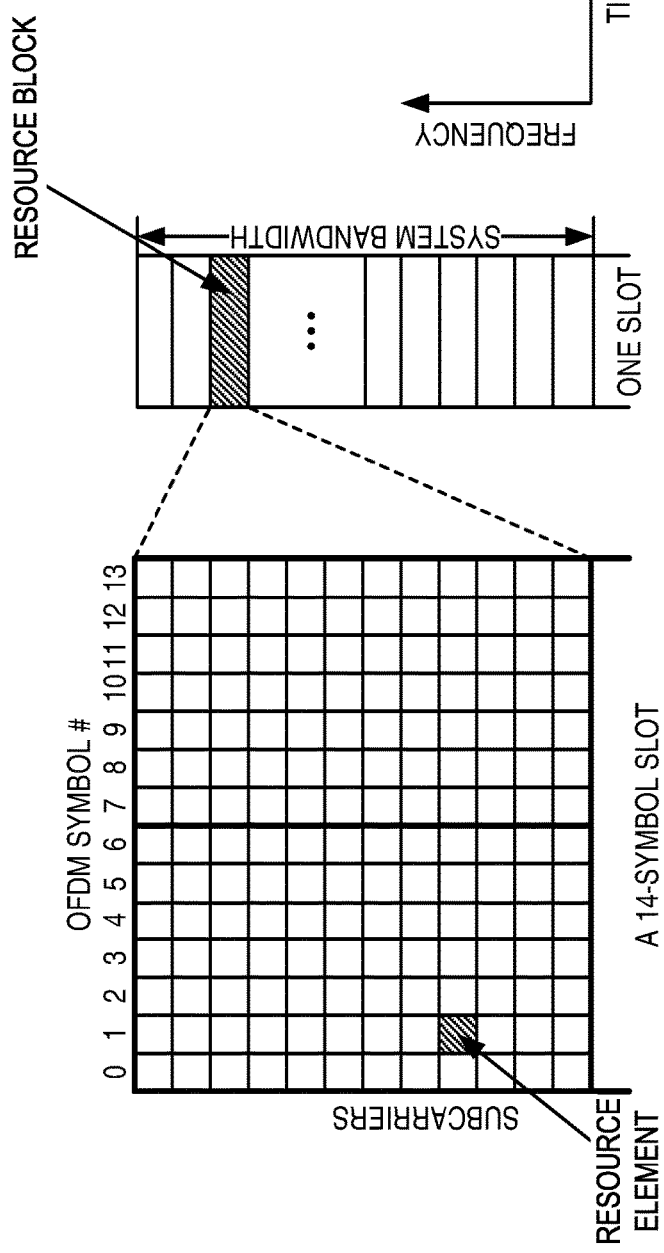
FIG. 2 illustrates a basic NR physical time-frequency resource grid where only one Resource Block (RB) within a 14-symbol slot is shown. One Orthogonal Frequency Division Multiplexing (OFDM) subcarrier during one OFDM symbol interval forms one Resource Element (RE)
Figure 3:
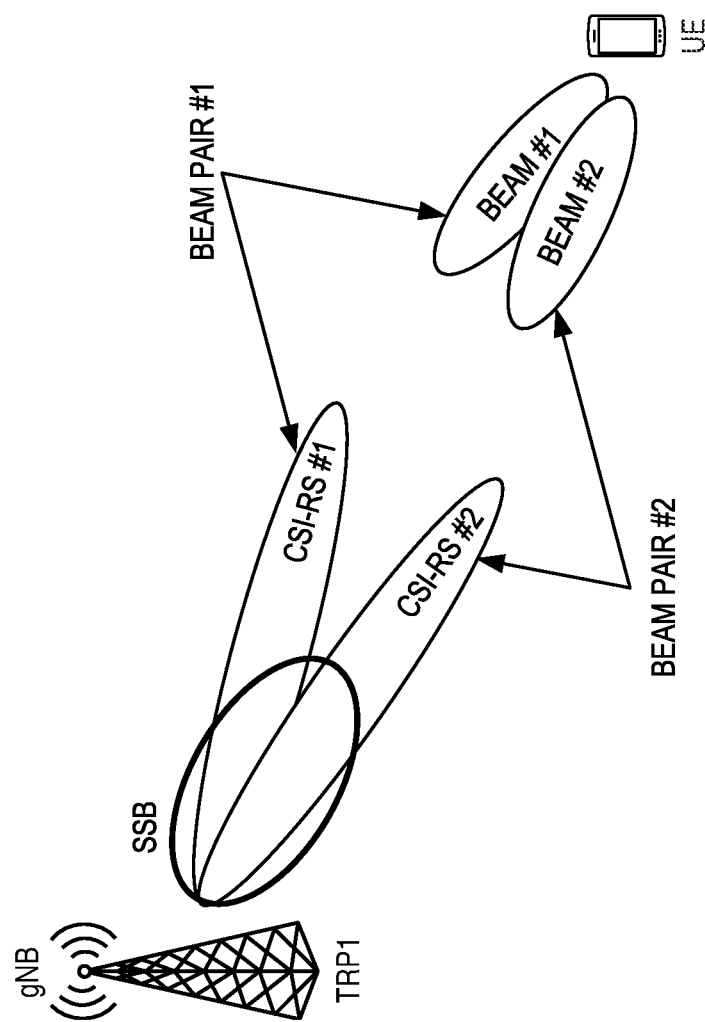
FIG. 3 illustrates an example where a gNB consists of a transmission/reception point (TRP) with two downlink (DL) beams each associated with a Channel State Information Reference Signal (CSI-RS)
Figure 6:
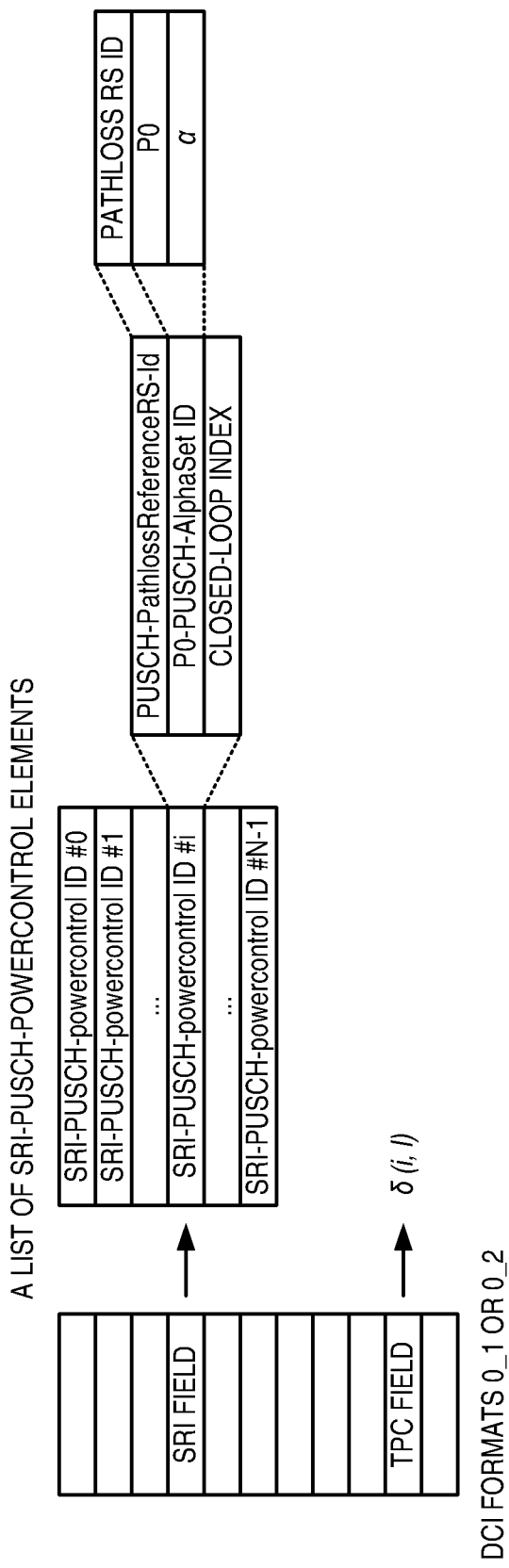
FIG. 6 illustrates dynamically scheduled PUSCH, where a UE is configured by RRC with a list of P0-PUSCH-Alpha sets and a list of SRI-PUSCH-PowerControl information elements, according to some embodiments of the present disclosure.
Figure 7:
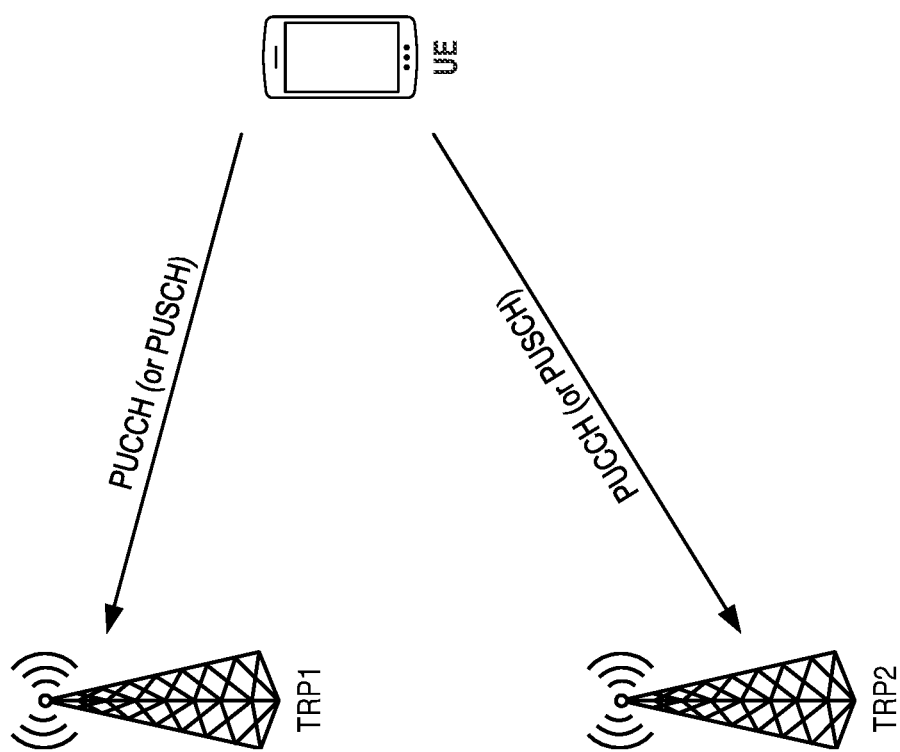
FIG. 7 illustrates transmitting a PUCCH or PUSCH towards different TRPs, either simultaneously or in different times, according to some embodiments of the present disclosure.
Figure 8:
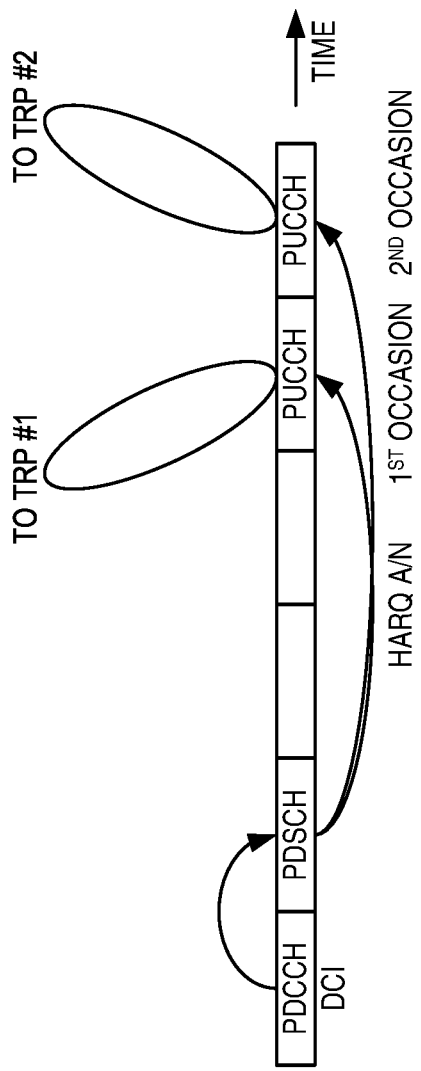
FIG. 8 illustrates an example where a PDSCH is scheduled by a DCI and the corresponding HARQ A/N is sent in a PUCCH which is repeated twice in time, one towards TRP #1 and the other towards TRP #2, according to some embodiments of the present disclosure.
Figure 9:
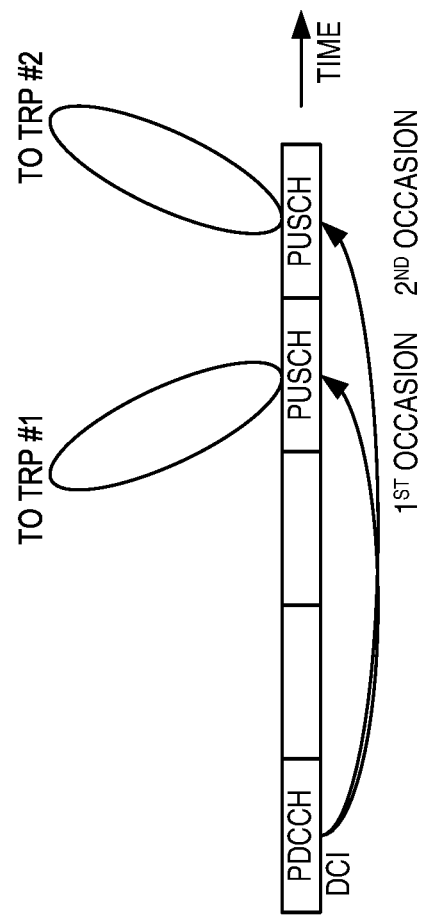
FIG. 9 illustrates an example of PUSCH repetitions where two PUSCH repetitions for a same TB are scheduled by a single Downlink Control Information (DCI), each PUSCH occasion is towards a different TRP, according to some embodiments of the present disclosure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 10:
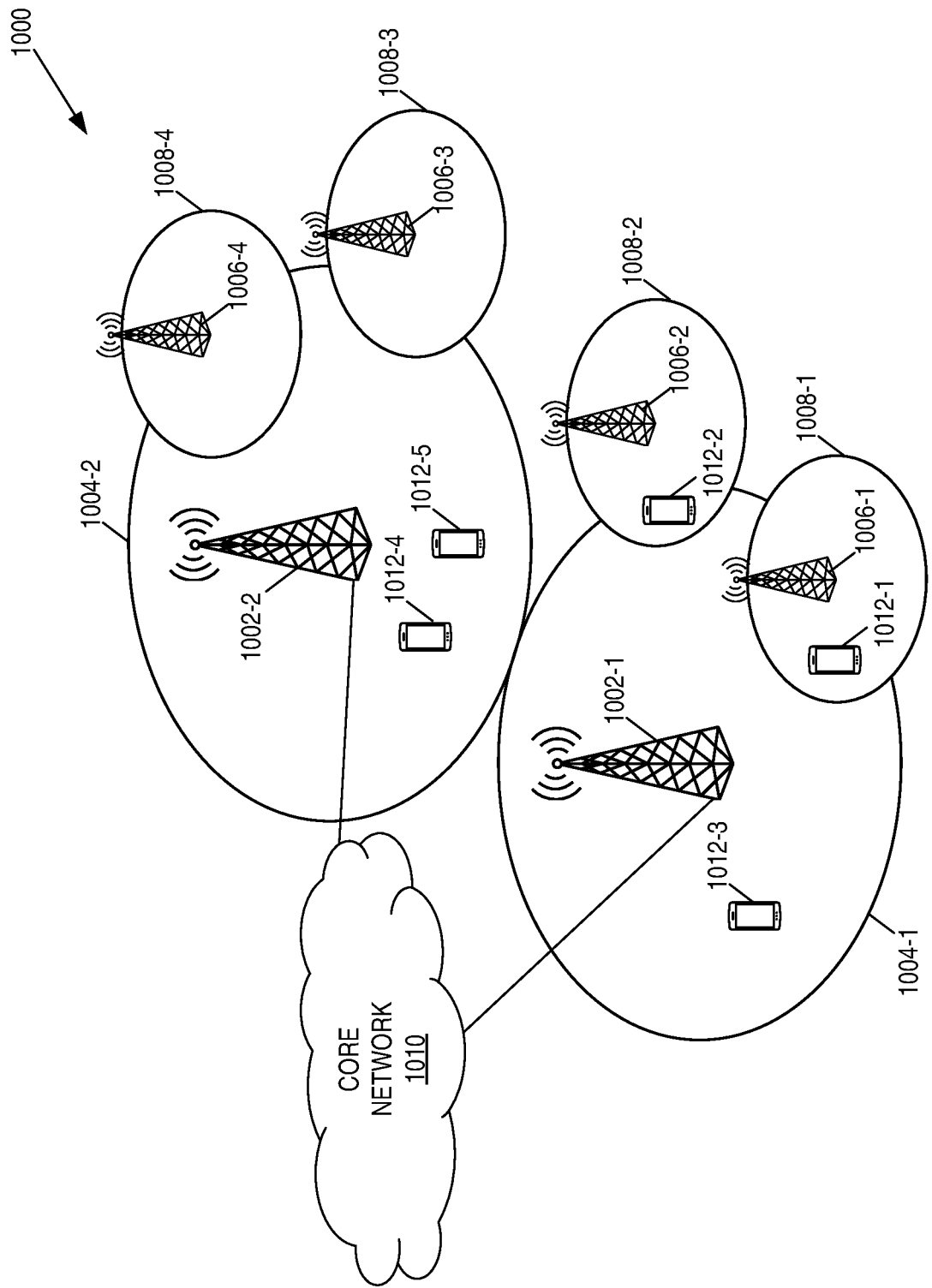
FIG. 10 illustrates one example of a cellular communications system 100 in which embodiments of the present disclosure may be implemented.

FIG. 10 illustrates one example of a cellular communications system 1000 in which embodiments of the present disclosure may be implemented. In the embodiments described herein, the cellular communications system 1000 is a 5G system (5GS) including a Next Generation RAN (NG-RAN) and a 5G Core (5GC). In this example, the RAN includes base stations 1002-1 and 1002-2, which in the 5GS include NR base stations (gNBs) and optionally next generation eNBs (ng-eNBs) (e.g., LTE RAN nodes connected to the 5GC) controlling corresponding (macro) cells 1004-1 and 1004-2. The base stations 1002-1 and 1002-2 are generally referred to herein collectively as base stations 1002 and individually as base station 1002. Likewise, the (macro) cells 1004-1 and 1004-2 are generally referred to herein collectively as (macro) cells 1004 and individually as (macro) cell 1004. The RAN may also include a number of low power nodes 1006-1 through 1006-4 controlling corresponding small cells 1008-1 through 1008-4. The low power nodes 1006-1 through 1006-4 can be small base stations (such as pico or femto base stations) or Remote Radio Heads (RRHs), or the like. Notably, while not illustrated, one or more of the small cells 1008-1 through 1008-4 may alternatively be provided by the base stations 1002. The low power nodes 1006-1 through 1006-4 are generally referred to herein collectively as low power nodes 1006 and individually as low power node 1006. Likewise, the small cells 1008-1 through 1008-4 are generally referred to herein collectively as small cells 1008 and individually as small cell 1008. The cellular communications system 1000 also includes a core network 1010, which in the 5G System (5GS) is referred to as the 5GC. The base stations 1002 (and optionally the low power nodes 1006) are connected to the core network 1010.

The base stations 1002 and the low power nodes 1006 provide service to wireless communication devices 1012-1 through 1012-5 in the corresponding cells 1004 and 1008. The wireless communication devices 1012-1 through 1012-5 are generally referred to herein collectively as wireless communication devices 1012 and individually as wireless communication device 1012. In the following description, the wireless communication devices 1012 are oftentimes UEs, but the present disclosure is not limited thereto.

Figure 11:
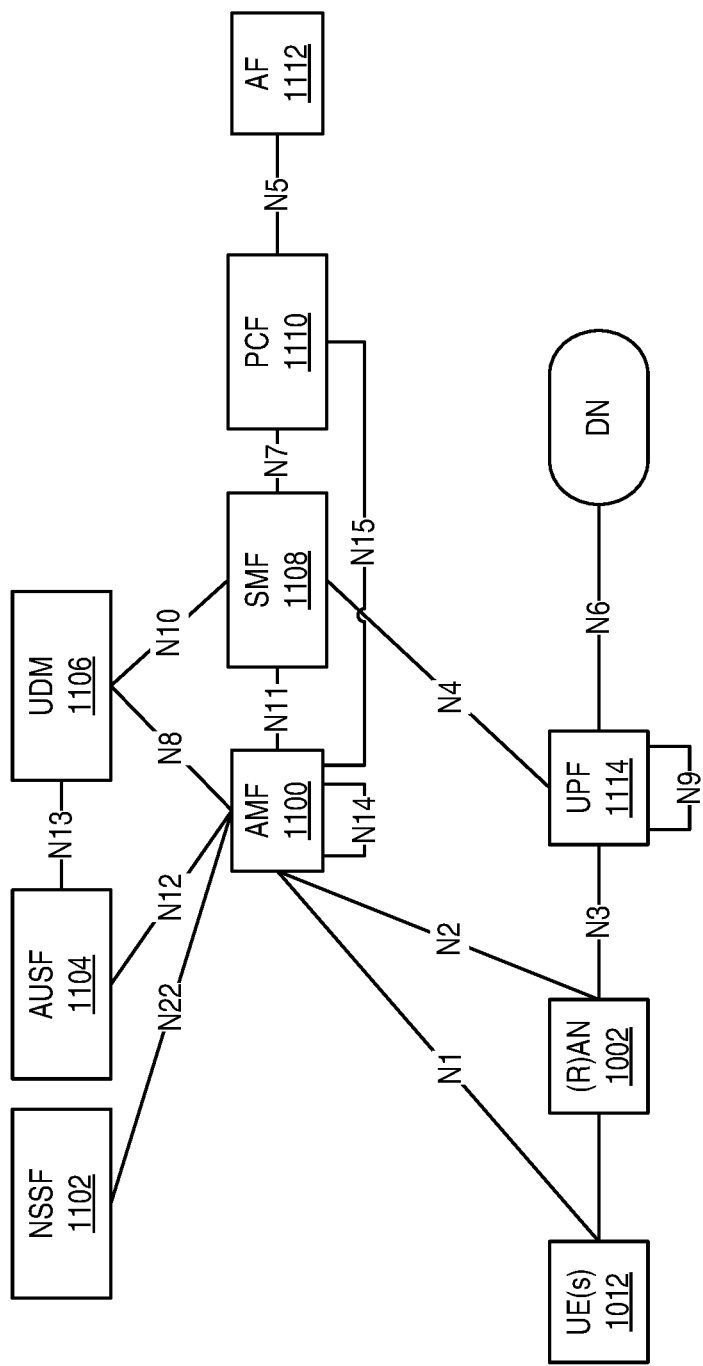
FIG. 11 illustrates a wireless communication system represented as a 5G network architecture composed of core Network Functions (NFs), where interaction between any two NFs is represented by a point-to-point reference point/interface.

FIG. 11 illustrates a wireless communication system represented as a 5G network architecture composed of core Network Functions (NFs), where interaction between any two NFs is represented by a point-to-point reference point/ interface. FIG. 11 can be viewed as one particular implementation of the system 1000 of FIG. 10.

Seen from the access side the 5G network architecture shown in FIG. 11 comprises a plurality of UEs 1012 connected to either a RAN 1002 or an Access Network (AN) as well as an AMF 1100. Typically, the R (AN) 1002 comprises base stations, e.g., such as eNBs or gNBs or similar. Seen from the core network side, the 5GC NFs shown in FIG. 11 include a NSSF 1102, an AUSF 1104, a UDM 1106, the AMF 1100, a SMF 1108, a PCF 1110, and an Application Function (AF) 1112.

Reference point representations of the 5G network architecture are used to develop detailed call flows in the normative standardization. The N1 reference point is defined to carry signaling between the UE 1012 and AMF 1100. The reference points for connecting between the AN 1002 and AMF 1100 and between the AN 1002 and UPF 1114 are defined as N2 and N3, respectively. There is a reference point, N11, between the AMF 1100 and SMF 1108, which implies that the SMF 1108 is at least partly controlled by the AMF 1100. N4 is used by the SMF 1108 and UPF 1114 so that the UPF 1114 can be set using the control signal generated by the SMF 1108, and the UPF 1114 can report its state to the SMF 1108. N9 is the reference point for the connection between different UPFs 1114, and N14 is the reference point connecting between different AMFs 1100, respectively. N15 and N7 are defined since the PCF 1110 applies policy to the AMF 1100 and SMF 1108, respectively. N12 is required for the AMF 1100 to perform authentication of the UE 1012. N8 and N10 are defined because the subscription data of the UE 1012 is required for the AMF 1100 and SMF 1108.

The 5GC network aims at separating UP and CP. The UP carries user traffic while the Cyclic Prefix (CP) carries signaling in the network. In FIG. 11, the UPF 1114 is in the UP and all other NFs, i.e., the AMF 1100, SMF 1108, PCF 1110, AF 1112, NSSF 1102, AUSF 1104, and UDM 1106, are in the CP. Separating the UP and CP guarantees each plane resource to be scaled independently. It also allows UPFs to be deployed separately from CP functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF 1100 and Session Management Function (SMF) 1108 are independent functions in the CP. Separated AMF 1100 and SMF 1108 allow independent evolution and scaling. Other CP functions like the PCF 1110 and AUSF 1104 can be separated as shown in FIG. 11. Modularized function design enables the 5GC network to support various services flexibly.

Each NF interacts with another NF directly. It is possible to use intermediate functions to route messages from one NF to another NF. In the CP, a set of interactions between two NFs is defined as service so that its reuse is possible. This service enables support for modularity. The UP supports interactions such as forwarding operations between different UPFs.

Figure 12:
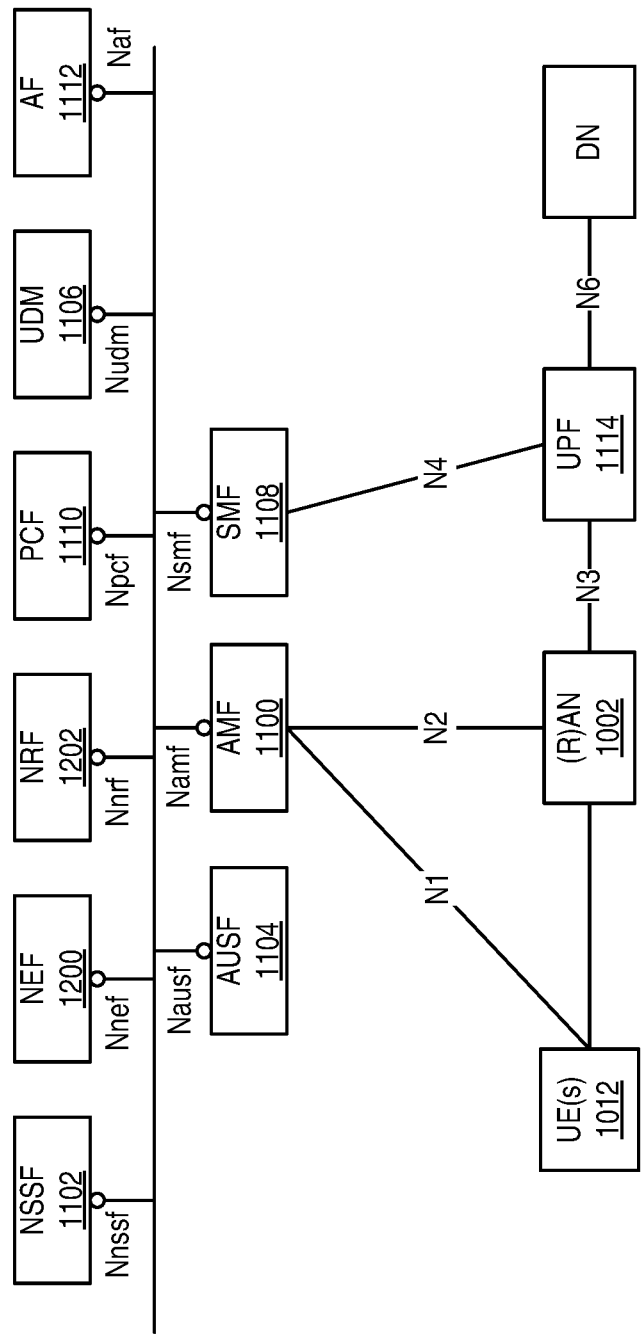
FIG. 12 illustrates a 5G network architecture using service-based interfaces between the NFs in the CP, instead of the point-to-point reference points/interfaces used in the 5G network architecture of FIG. 11.

FIG. 12 illustrates a 5G network architecture using service-based interfaces between the NFs in the CP, instead of the point-to-point reference points/interfaces used in the 5G network architecture of FIG. 11. However, the NFs described above with reference to FIG. 11 correspond to the NFs shown in FIG. 12. The service(s) etc. that a NF provides to other authorized NFs can be exposed to the authorized NFs through the service-based interface. In FIG. 12 the service based interfaces are indicated by the letter "N" followed by the name of the NF, e.g., Namf for the service based interface of the AMF 1100 and Nsmf for the service based interface of the SMF 1108, etc. The NEF 1200 and the NRF 1202 in FIG. 12 are not shown in FIG. 11 discussed above. However, it should be clarified that all NFs depicted in FIG. 11 can interact with the NEF 1200 and the NRF 1202 of FIG. 12 as necessary, though not explicitly indicated in FIG. 11.

Some properties of the NFs shown in FIGS. 11 and 12 may be described in the following manner. The AMF 1100 provides UE-based authentication, authorization, mobility management, etc. A UE 1012 even using multiple access technologies is basically connected to a single AMF 1100 because the AMF 1100 is independent of the access technologies. The SMF 1108 is responsible for session management and allocates Internet Protocol (IP) addresses to UEs. It also selects and controls the UPF 1114 for data transfer. If a UE 1012 has multiple sessions, different SMFs 1108 may be allocated to each session to manage them individually and possibly provide different functionalities per session. The AF 1112 provides information on the packet flow to the PCF 1110 responsible for policy control in order to support Quality of Service (QOS). Based on the information, the PCF 1110 determines policies about mobility and session management to make the AMF 1100 and SMF 1108 operate properly. The Authentication Server Function (AUSF) 1104 supports authentication function for UEs or similar and thus stores data for authentication of UEs or similar while the UDM 1106 stores subscription data of the UE 1012. The Data Network (DN), not part of the 5GC network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

As discussed above, PHR report is per carrier and does not explicitly take beam-based operation into account. In existing NR, UL power control and PHR report consider UL transmissions to a single TRP with one or more beams. For closed-loop power control, Transmit Power Control (TPC) command carried in a DCI is for one closed loop. In case of multiple TRP transmission, how to perform UL power control is an issue. More specifically, how to differentiate closed loops among TRPs and how to indicate multiple TPC commands one for each TRP in a DCI is an issue. Similarly, for PHR, whether and how to report PHR for multiple TRPs is an issue.

Systems and methods for power control for uplink transmissions towards multiple TRPs are provided. FIG. 13 illustrates a method performed by a wireless device for enabling power control of multiple TRPs. In some embodiments, the wireless device performs at least one of: receiving in a Downlink Control Information, DCI, a first Transmit Power Control, TPC, command and a second TPC command and an indication of a first transmission of the physical channel to a first TRP associated with a first closed-loop and a second transmission of the physical channel to a second TRP associated with a second closed-loop (step 1300); determining a first transmit power and a second transmit power based on the first and the second TPC commands, respectively (step 1302); and applying the first transmit power and the second transmit power to the first UL transmission and the second UL transmission, respectively (step 1304). In this way, some embodiments herein enable more accurate per TRP power control with a simple signaling for multiple UL transmissions towards different TRPs scheduled by a single DCI.

FIG. 14 illustrates a method performed by a base station for enabling power control of multiple TRPs. In some embodiments, the base station performs at least one of: to the wireless device, a configuration of a first and a second power control closed-loops associated with a first and a second TRPs, respectively (step 1400); transmitting, to the wireless device, in a DCI a first Transmit Power Control, TPC, command and a second TPC command and an indication of a first UL transmission of the physical channel to the first TRP and a second UL transmission of the physical channel to the second TRP, respectively (step 1402); and receiving the first UL transmission with a first transmit power at the first TRP and the second UL transmission with a second transmit power at the second TRP (step 1404). In this way, some embodiments herein enable more accurate per TRP power control with a simple signaling for multiple UL transmissions towards different TRPs scheduled by a single DCI.

To simplify the discussion, two TRPs are considered in the following discussion, but it is noted that the principle can be easily extended to more than two TRPs.

Since the channels to different TRPs from a UE are generally different, different closed loops are needed for different TRPs for UL power control. Each TRP may also have different beams for reception, thus more than one closed loop may be needed for each TRP. Note that a TRP is implicitly indicated to a UE through spatial relations or TCI states for UL transmission and multiple spatial relations/UL TCI states may be associated with a same TRP.

Note that TRPs might not be part of standard specifications, instead "TCI states", "spatial relations" or SRIs can be used, as part of the standard, which are then equivalent to indicate a certain TRP.

To facilitate signaling and to maintain consistency between gNB and the UE on which closed loop a TPC command is for, in one embodiment, the closed loops associated with all TRPs in the UL are indexed together. For example, up to four closed loops may be configured for two TRPs, two per TRP. Then to support multiple TRPs, the existing closed loop index range specified for PUSCH, PUCCH, and SRS may be extended. Note that the number of closed loops in NR is specified as PUCCH-PC-AdjustmentStates for PUCCH, PUSCH-PC-AdjustmentStates for PUSCH, and srs-PowerControlAdjustmentStates for SRS.

FIG. 15 illustrates an example showing configuration of more than two closed loop indices for PUSCH. For extending the number of closed loops for PUSCH to more than two, one option is to introduce a new field 'xPUSCH-PC-AdjustmentStates' as part of the PUSCH-PowerControl information element that can have 'twoStates' or 'fourStates' as candidate values as shown in FIG. 15. Although FIG. 15 shows 'xPUSCH-PC-AdjustmentStates' having two possible configurable values (i.e., two or four states), other integer values (e.g., 3, 5, 6, 7, 8, etc.) are also possible configurable values in some other embodiments. When 'xPUSCH-PC-AdjustmentStates' is present in PUSCH-PowerControl and is set to 'fourStates', then the UE maintains four power control states (i.e., four closed loops) for PUSCH. Furthermore, in some embodiments, as the closed looped index to be applied to a PUSCH is indicated by SRI via the closed loop index 'SRI-PUSCH-ClosedLoopIndex' given in 'SRI-PUSCH-PowerControl' shown in FIG. 15, the range of 'SRI-PUSCH-ClosedLoopIndex' is extended beyond 2. For instance, when the UE is configured to maintain four closed loops for PUSCH, the range of 'SRI-PUSCH-ClosedLoopIndex' is extended to 4 by including indices i2 and i3 in addition to i0 and i1. When a first SRS resource is indicated via a first SRI in a DCI scheduling PUSCH, then the spatial relation of that SRS is used to transmit a first PUSCH towards a first TRP. The 'SRI-PUSCH-ClosedLoopIndex' given in the 'SRI-PUSCH-PowerControl' corresponding to the first SRS resource is used for the first PUSCH towards the first TRP.

In an alternative embodiment, instead of including 'xPUSCH-PC-AdjustmentStates' with two possible values 'twoStates' or 'fourStates' in the PUSCH-PowerControl information element, a field dedicated to 4 closed loops can be optionally present in PUSCH-PowerControl information element. When this optional field is configured, the UE maintains four closed loops for PUSCH.

FIG. 16 illustrates an example showing configuration of more than two closed loop indices for PUCCH. For extending the number of closed loops for PUCCH to more than two, one option is to introduce a new field 'xPUCCH-PC-AdjustmentStates' as part of the PUCCH-PowerControl information element that can have 'twoStates' or 'fourStates' as candidate values as shown in FIG. 16A. Although FIG. 16B shows 'xPUCCH-PC-AdjustmentStates' having two possible configurable values (i.e., two or four states), other integer values (e.g., 3, 5, 6, 7, 8 etc.) are also possible configurable values in some other embodiments. When 'xPUCCH-PC-AdjustmentStates' is present in PUCCH-PowerControl and is set to 'fourStates', then the UE maintains four power control states (i.e., four closed loops) for PUCCH. Furthermore, in some embodiments, as the closed looped index to be applied to a PUCCH is indicated by Spatial Relation activated for the PUCCH via the closed loop index 'closedLoopIndex' given in 'PUCCH-SpatialRelationInfo' shown in FIG. 16B, the range of 'closedLoopIndex' is extended beyond two. For instance, when the UE is configured to maintain four closed loops for PUCCH, the range of 'closedLoopIndex' is extended to four by including indices i2 and i3 in addition to i0 and i1 as shown in FIG. 16B. When a first spatial relation is activated for a PUCCH, then that spatial relation is used to transmit a first PUCCH towards a first TRP. The 'closedLoopIndex' given in the 'PUCCH-SpatialRelationInfo' corresponding to the first spatial relation activated for the PUCCH is used for the first PUCCH towards the first TRP.

In an alternative embodiment, instead of including 'xPUCCH-PC-AdjustmentStates' with two possible values 'twoStates' or 'fourStates' in the PUCCH-PowerControl information element, a field dedicated to 4 closed loops can be optionally present in PUCCH-PowerControl information element. When this optional field is configured, the UE maintains four closed loops for PUCCH.

PUCCH UL power control for multiple TRPs: In this embodiment, it is assumed that a PUCCH carrying HARQ A/N for a PDSCH scheduled by a single DCI is repeated multiple times towards different TRPs either in a same PUCCH resource or different PUCCH resources. For each TRP, one or more closed power control loops are maintained at a UE and the gNB for PUCCH transmissions. For each PUCCH transmission to a TRP, the open loop power control parameters are specified in a PUCCH spatial relation activated for a corresponding PUCCH resource over which the PUCCH is transmitted. Note that multiple PUCCH spatial relations may be activated for a PUCCH resource.

In this embodiment, multiple TPC commands are included in a DL DCI (e.g., DCI format 1_1 or DCI format 1_2) scheduling a PDSCH. Each TPC command is associated to a closed loop specified in associated PUCCH spatial relation for PUCCH transmission. A first and a second TPC commands are associated respectively with a first and a second PUCCH spatial relations indicated in the DL DCI.

In one embodiment, the number of TPC commands in a DL DCI may be determined by the number of closed loops configured for PUCCH in PUCCH-PowerControl IE. For example, if one or two closed loops are configured, one TPC command is included, and if three or four closed loops are configured, then two TPC commands are included.

In another embodiment, the number of TPC commands in a DL DCI may be determined by the maximum number of PUCCH spatial relations activated per PUCCH resource among all PUCCH resources. For example, one TPC command if only one spatial relation is activated and two TPC commands if two spatial relations are activated for at least one PUCCH resource.

In yet another embodiment, the number of TPC commands in a DL DCI may be determined by the maximum number of PUCCH resources that can be indicated in the DCI. For example, one TPC command if only one PUCCH resource can be indicated and two TPC commands if two PUCCH resource can be indicated.

Figure 17:
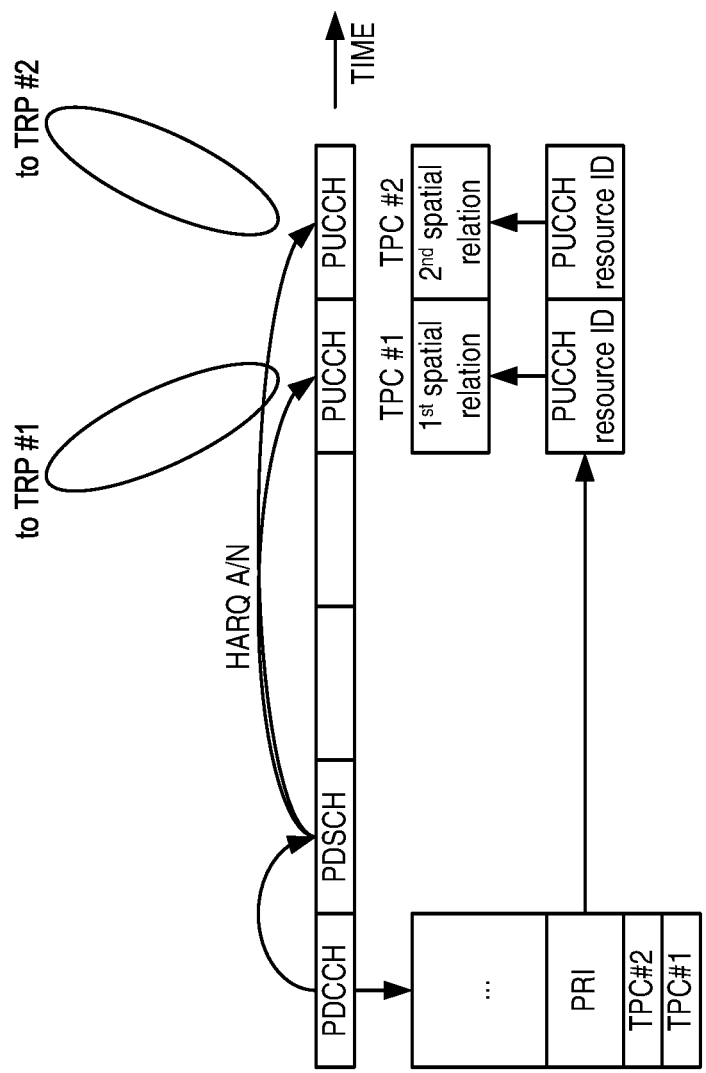
FIG. 17 illustrates an example of signaling two Transmit Power Control (TPC) commands, one for each of two PUCCH transmissions towards two TRPs, according to some embodiments of the present disclosure.

An example is shown FIG. 17, where a PDSCH is scheduled by a DL DCI and the corresponding HARQ A/N carrying PUCCH is repeated two times, one towards TRP #1 and the other towards TRP #2. FIG. 17 illustrates an example of signaling two TPC commands, one for each of two PUCCH transmissions towards two TRPs. The number of repetitions is indicated by the number of PUCCH spatial relations activated for a corresponding PUCCH resource indicated by the PRI field in the DCI. In this example, two PUCCH spatial relations are activated for the PUCCH resource, each associated with one TRP. Two TPC commands, i.e., TPC #1 and TPC #2, are included in the DL DCI with TPC #1 associated with the first spatial relation and TPC #2 associated with the second spatial relation. Alternatively, two PUCCH resources may be indicated in DCI and each PUCCH resource is activated with a different spatial relation.

In another embodiment, it is assumed that a PUCCH carrying Hybrid Automatic Repeat Request (HARQ) A/N for a PDSCH scheduled by a single DCI is repeated multiple times towards different TRPs wherein the open loop power control parameters or indicators of such open loop power control parameters are specified in TCI states. Note that multiple TCI states may be activated for a PUCCH resource.

In one variant of the embodiment, the TCI states can be dedicated uplink TCI states. In another variant of the embodiment, the TCI states can be unified between uplink and downlink (i.e., the same TCI state can be used towards uplink or downlink transmission.

In a detailed embodiment, multiple TPC commands are included in a DL DCI scheduling a PDSCH where the PDSCH can be scheduled with the DL DCI indicating two TCI states (i.e., a codepoint in TCI field in the DL DCI indicating two TCI states). In this case, the two TCI states are used as unified uplink/downlink TCI states, and the open loop power control parameters and closed loop index for a PUCCH transmission is specified in a unified TCI state. Each TPC command included in the DL DCI is associated to a closed loop index specified in one of the unified TCI state(s) indicated in the DCI. A first and a second TPC commands for the first and the second PUCCH transmission are associated respectively with a first and a second unified TCI states indicated in the DL DCI.

In one embodiment, the number of TPC commands in a DL DCI may be determined by the maximum number of unified uplink/downlink TCI states activated in any one of the codepoints in the TCI field (i.e., Transmission Configuration Indication field) of the DL DCI. That is, if at least one codepoint in the TCI field of the DL DCI has two unified uplink/downlink TCI states activated, then there are two TPC commands in the DL DCI. If none of the codepoints in the TCI field of the DL DCI has two unified uplink/downlink TCI states activated, then there is a single TPC command in the DL DCI.

Figure 18:
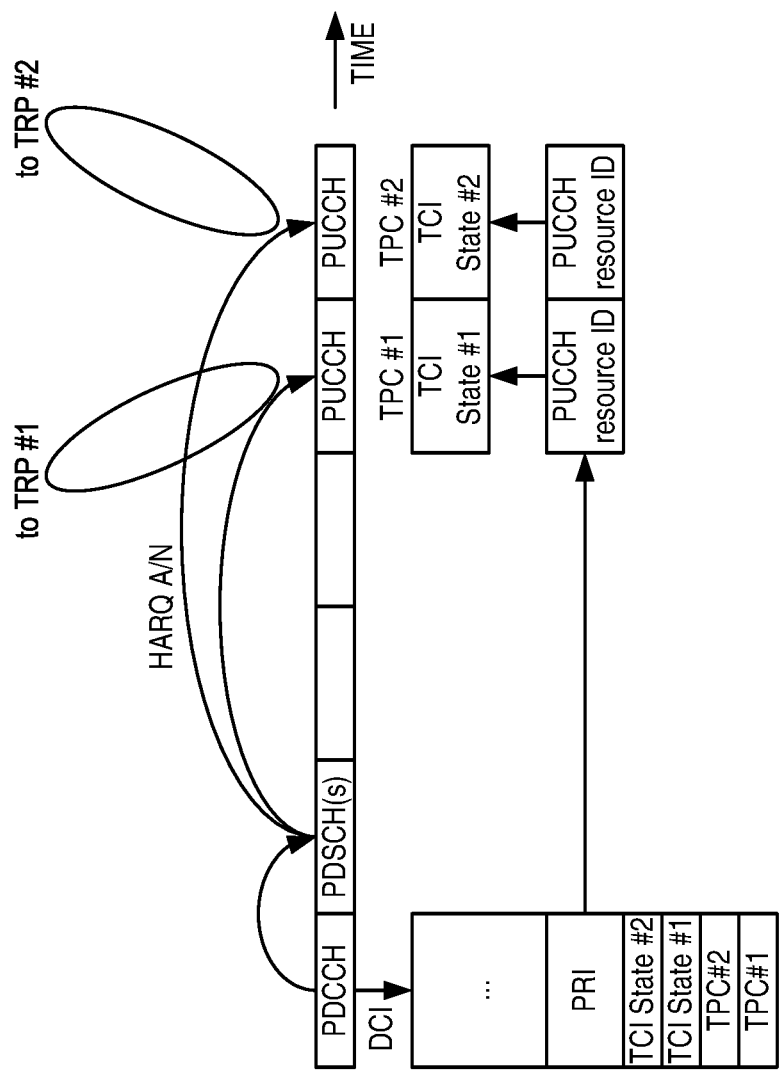
FIG. 18 illustrates a second example of signaling two TPC commands, one for each of two PUCCH transmissions towards two TRPs, according to some embodiments of the present disclosure.

A second example is shown FIG. 18, where a PDSCH is scheduled by a DL DCI and the corresponding HARQ A/N carrying PUCCH is repeated two times, one towards TRP #1 and the other towards TRP #2. FIG. 18 illustrates a second example of signaling two TPC commands, one for each of two PUCCH transmissions towards two TRPs. The number of PUCCH repetitions is indicated by the number of unified uplink/downlink TCI states indicated by the TCI field in the DL DCI. In this example in FIG. 18, two unified uplink/downlink TCI states are indicated in DL DCI, each PUCCH repetition is transmitted using one of the unified uplink/downlink TCI states and is associated with one TRP. Two TPC commands, i.e., TPC #1 and TPC #2, are included in the DL DCI with TPC #1 associated with the first unified uplink/downlink TCI state and TPC #2 associated with the second unified uplink/downlink TCI state.

In one embodiment, for PUCCH carrying a HARQ A/N for a corresponding PDSCH, the TCI state(s) for the PUCCH is the same as that indicated in the TCI field in the DCI scheduling the PDSCH, i.e., the TCI state(s) of PUCCH follows the TCI state(s) of the corresponding PDSCH.

PUSCH UL power control for multiple TRPs: In this embodiment, multiple TPC commands are included in a UL DCI (e.g., DCI format 0_1 and DCI format 0_2) when scheduling a PUSCH transmission to multiple TRPs, each indicated by an SRI in the DCI. The first and the second TPC commands are associated with respectively the first and the second SRIs indicated in the DCI. For each SRI, open loop power control parameters are specified in the corresponding SRI-PUSCH-PowerControl information element configured by RRC.

In an alternative embodiment, multiple TPC commands are included in an UL DCI (e.g., DCI format 0_1 and DCI format 0_2) when scheduling a PUSCH transmission to multiple TRPs, each indicated by unified uplink/downlink TCI state or dedicated uplink TCI state in the UL DCI (i.e., for this case, there are either two unified uplink/downlink TCI states or two dedicated uplink TCI states in the UL DCI). In one variant of the embodiment, the first and the second TPC commands are associated with the first and the second unified uplink/downlink TCI states indicated in the DCI. In another variant of the embodiment, the first and the second TPC commands are associated with the first and the second dedicated uplink TCI states indicated in the DCI.

In one embodiment, the number of TPC commands in a UL DCI may be determined by the number of SRIs configured for the DCI.

In another embodiment, the number of TPC commands in a UL DCI may be determined by the number of closed loops configured for PUSCH. For example, if one or two closed loops are configured, one TPC command is included, and if three or four closed loops are configured, then two TPC commands are included.

In another embodiment, the number of TPC commands in a UL DCI may be determined by the maximum number of unified uplink/downlink TCI states or dedicated uplink TCI states activated in any one of the codepoints in a TCI field (i.e., Transmission Configuration Indication field) of the UL DCI. That is, if at least one codepoint in the TCI field of the UL DCI has two unified uplink/downlink TCI states or two uplink TCI states activated, then there are two TPC commands in the UL DCI. If none of the codepoints in the TCI field of the UL DCI has two unified uplink/downlink TCI states or two dedicated TCI states activated, then there is a single TPC command in the UL DCI.

Figure 19:
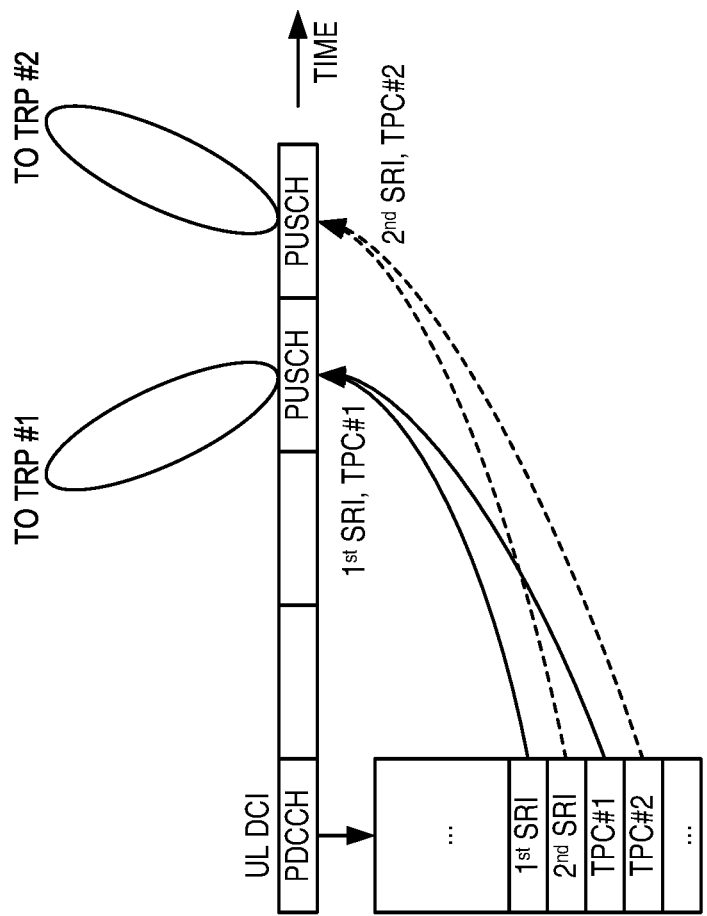
FIG. 19 illustrates an example of signaling two TPC commands, one for each of two PUSCH transmissions towards two TRPs, according to some embodiments of the present disclosure.

An example is shown in FIG. 19, where multiple PUSCH transmissions for a same TBs scheduled by a UL DCI with two SRIs and two TPC commands. FIG. 19 illustrates an example of signaling two TPC commands, one for each of two PUSCH transmissions towards two TRPs. The number of PUSCH transmission occasions is indicated by the number of SRIs in the UL DCI. In this example, two PUSCH transmissions are indicated, each associated with one TRP. Two TPC commands, i.e., TPC #1 and TPC #2, are included in the UL DCI with TPC #1 associated with the first SRI and TPC #2 associated with the second SRI.

Figure 20:
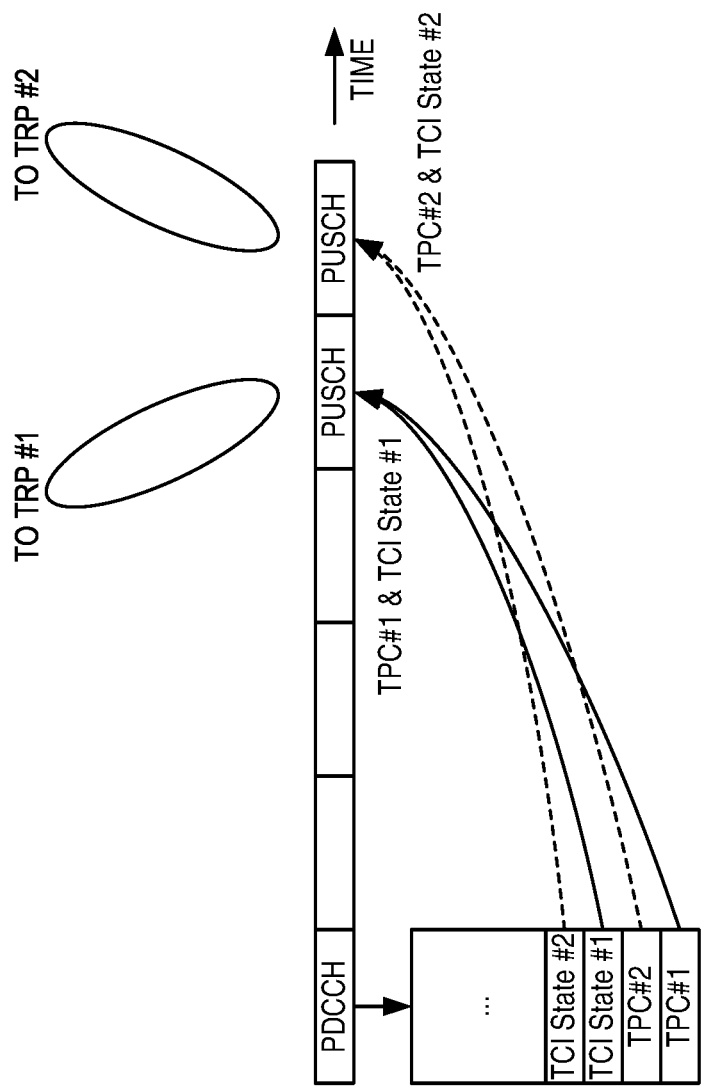
FIG. 20 illustrates an example where multiple PUSCH transmissions for a same TB is scheduled by a UL DCI with two unified uplink/downlink TCI states (or alternatively two dedicated uplink TCI states) and two TPC commands, according to some embodiments of the present disclosure.

A second example is shown in FIG. 20, where multiple PUSCH transmissions for a same TB is scheduled by a UL DCI with two unified uplink/downlink TCI states (or alternatively two dedicated uplink TCI states) and two TPC commands. FIG. 20 illustrates a second example of signaling two TPC commands, one for each of two PUSCH transmissions towards two TRPs. The number of PUSCH transmission occasions is indicated by the number of unified uplink/downlink TCI states (or alternatively two dedicated uplink TCI states) indicated in the UL DCI. In this example, two PUSCH transmissions are indicated, each associated with one TRP. Two TPC commands, i.e., TPC #1 and TPC #2, are included in the UL DCI with TPC #1 associated with the first unified uplink/downlink TCI state (or alternatively the first dedicated uplink TCI state) and TPC #2 associated with the second unified uplink/downlink TCI state (or alternatively the second dedicated uplink TCI state).

TPC command for PUCCH/PUSCH in DCI format 2_2: In existing DCI format 2_2 for sending TPC commands to multiple UEs, a TPC command is allocated to each of a group of UEs. The TPC commands are for PUSCH if the CRC of the DCI is scrambled by TPC-PUSCH-RNTI or for PUCCH if it is scrambled by TPC-PUCCH-RNTI. A PUCCH (or PUSCH) TPC command for a UE may be accompanied with a one bit closed loop indicator if the UE is configured with two closed loops for PUCCH (or PUSCH). The DCI does not differentiate different TRPs.

With indexing of closed loops together among all TRPs, a simple extension of DCI format 2_2 for multiple TRPs is to increase the bit width of the closed loop indicator from one bit to multiple bits, depending on the number of closed loops configured for PUCCH or PUSCH over all TRPs. For example, if four closed loops are configured, two bits can be used for the closed loop indicator.

Figure 21:
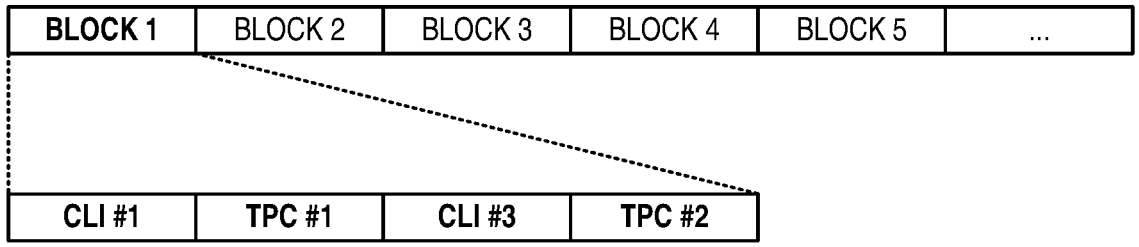
FIG. 21 illustrates an example of including multiple TPC commands in a block associated with a UE in an extended DCI format 2_2, according to some embodiments of the present disclosure.

In another embodiment, each block in DCI format 2_2 may contain multiple TPC commands each associated with a closed loop. The number of TPC commands in the block may be determined by the number of closed loops configured or configured by RRC. An example is shown in FIG. 21, where two closed loops are configured for PUSCH (or PUCCH) over all TRPs. FIG. 21 illustrates an example of including multiple TPC commands in a block associated with a UE in an extended DCI format 2_2.

TPC command for SRS in DCI format 2_3: In existing DCI format 2_3 for sending TPC commands for SRS to one or more UEs, one or more TPC commands can be allocated to UEs. A single closed loop is assumed for SRS, thus there is no closed loop indicator. In case of SRS transmission to multiple TRPs, more than one closed loop is required. To support SRS transmission to multiple TRPs, a closed loop indicator can be introduced in DCI format 2_3 for UEs configured with multiple closed loops for SRS. The number of bits for the closed loop indicator can be determined by the number of closed loops configured. For example, if two closed loops are configured, one bit can be used.

In another embodiment, each block in DCI format 2_3 may contain multiple TPC commands each associated with a closed loop for SRS. The number of TPC commands in the block may be determined by the number of closed loops configured or may be configured.

UL power control with UL TCI states: If UL TCI states are introduced for UL beam indication instead of using spatial relations for PUCCH and SRS, and SRI for PUSCH, for a given UL channel (i.e., PUCCH, PUSCH, or SRS), each UL TCI state can be associated with a set of power control parameters. For a given UL TCI state, different sets of power control parameters may be associated to PUCCH, PUSCH, and SRS. Each set of power control parameters may include one or more of $P_O$, $\alpha$, a pathloss RS, and a closed loop index and can be considered as a "power control state" with a power control state ID. Each of $P_O$, $\alpha$, pathloss RS, or closed loop index is from a configured list of the corresponding parameters. For example, a list of $P_O$, $\alpha$, pathloss RS, or closed loop indices may be configured for PUSCH (or PUCCH, SRS).

In one scenario, UL TCI states are the same as DL TCI states, i.e., same TCI states are shared by both DL and UL. In some embodiment, some power control parameters common to all UL channels such as pathloss RS (and/or possibly the closed loop index) may be included in a UL TCI state. Following the above embodiment, pathloss RS (and/or closed loop index) used one mapping which has "UL state ID", or it follows the ID of UL TCI state (UL TCI ID) or pathloss RS (pathloss RS ID). Then, $P_O$ and $\alpha$ are mapped together as "power control state" which also has an ID. Alternative example is to have closed loop index in the "power control state" instead of "UL state". Then, the UL state can be configured per UL PWB and shared with UL channels/signals and the "power control state" can be configured per UL channel/signal.

For PUSCH, in DCI, the SRI field is currently used to indicate the "UL transmission state" which includes UL spatial relation, pathloss RS and closed loop index and power control state. One issue is that the number of such states needed may increase. Especially if two SRI fields are needed for two TRP transmissions. In one embodiment, an UL transmission state is defined that includes two UL spatial relations, two pathloss RS, two closed loop indexes and one set of, $P_O$ and $\alpha$ This is indicated in DCI as one SRI field. Then another delta "SRI" field indicates $P_O$ and $\alpha$ values relative to the ones selected to the first TRP. These relative values are configured in a "delta power control state" where e.g., alpha_delta is relative to alpha for TRP1 and P0_delat is relative to P0 to TRP1.

Figure 22:
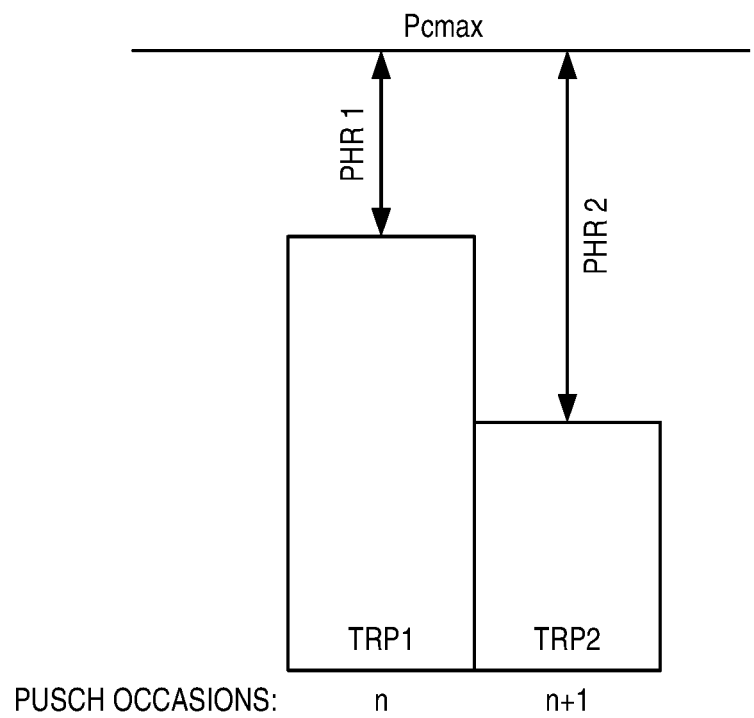
FIG. 22 illustrates an example of different power head rooms to two TRPs, according to some embodiments of the present disclosure.

PHR reporting for multiple TRPs: When a PHR report is to be carried on a PUSCH that is to be repeated towards different TRPs, different transmit powers may be determined for different PUSCH occasions. For PHR calculation based on an actual PUSCH, if the PHR carrying PUSCH is repeated towards different TRPs, which PUSCH occasion to be used for calculating the PHR is an issue. An example is shown in FIG. 22, where a PUSCH repetition is scheduled to two TRPs. FIG. 22 illustrates an example of different power head rooms to two TRPs.

In one embodiment, multiple PHRs are calculated, each associated with a PUSCH occasion to a TRP. Either the largest or the smallest PHR is reported. In another embodiment, the average of the multiple PHRs is reported. Yet in another embodiment, PRHs to all TRPs are reported.

Joint encoding of multiple TPC: In this embodiment, it is assumed that the power control loops are dependent. This may happen if the main reason for the path loss is due to propagation close to the UE. In this case, for example, an increase of the power towards a first TRP is most likely also generating an increase of the power towards a second TRP. An example is that the UE is moving into a basement of a building. In this embodiment, this assumption is utilized to compress the signaling overhead by joint encoding or equivalently, introducing some dependence between the power.

For example, for PUCCH, the corresponding table can be seen in the table below. One additional TPC bit has been added, hence some of the combinations have been removed, thereby reducing the DCI payload with one bit compared to the case with two independent TPC command fields. For example, the combination that the power to TRP #1 is reduced 1 dB simultaneously as the power to TRP #2 is increased 3 dB is removed. In case of PUCCH transmission to only a single TRP, the first four entries in the first two columns of the table apply, which corresponds to the existing PUCCH table. Similar idea can be applied to PUSCH.

TABLE 3

Mapping of TPC Command Field using joint encoding and compression

| TPC Command Field | Accumulated $\delta(m, l)$ [dB] for TRP#1 | Accumulated $\delta(m, l)$ [dB] for TRP#2 |
| --- | --- | --- |
| 0 | −1 | −1 |
| 1 | 0 | 0 |
| 2 | 1 | 1 |
| 3 | 3 | 3 |
| 4 | −1 | 0 |
| 5 | 0 | −1 |
| 6 | 0 | 1 |
| 7 | 1 | 0 |

UE indication of supporting separate power control per TRP: In this embodiment, indications for how UE is capable of supporting power control in the uplink associated with Multi-TRP transmissions is signaled via UE capability signaling from UE to the network. A UE does not support separate closed loop power control per TRP will apply same closed loop index and/or open loop power adjustment, though the UE can still indicate it supports UL M-TRP transmission. A UE supports separate open loop power adjustment may also support separated power headroom report.

One example to indicate supporting of M-TRP in UL is UE indicate supporting of PUSCH/PUCCH/SRS associated with different CORESETPoolIndex values, different CORESETPoolIndex value stands for different TRP, the maximum number of closed loops power control via different TPC loops for PUCCH/PUSCH per TRP is indicated via capability signaling, the maximum number of power headroom report per TRP is also indicated. Another example supporting M-TRP in UL is associated with supporting multiple UL TCIs/SRIs for simultaneous PUSCH/PUCCH transmission.

Depending on UE capability signaling, three different levels of power control, per UE, per TRP, per UCI, can be configured to UE for PUSCH, PUCCH, or Power Headroom report. The RRC parameter examples "perTCIPuschPowerControl", "perTCIPUCCHPowerControl", "perTCIPHRReport". UE may expect network to configure the same level of power control for the PUSCH/PHR/PUCCH, not a combination of different levels.

Figure 23:
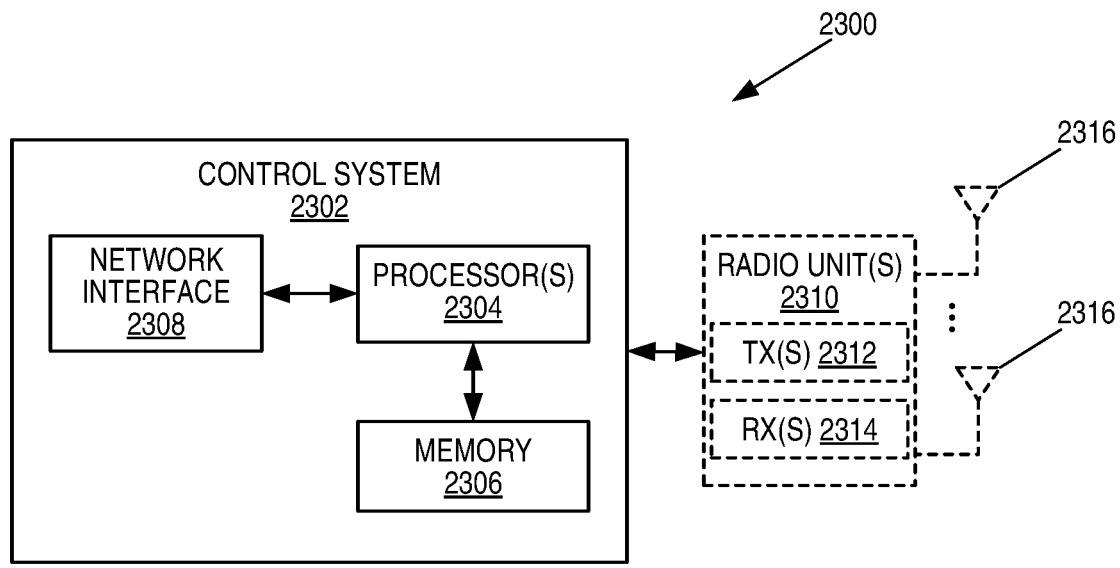
FIG. 23 is a schematic block diagram of a radio access node according to some embodiments of the present disclosure.

FIG. 23 is a schematic block diagram of a radio access node 2300 according to some embodiments of the present disclosure. Optional features are represented by dashed boxes. The radio access node 2300 may be, for example, a base station 1002 or 1006 or a network node that implements all or part of the functionality of the base station 1002 or gNB described herein. As illustrated, the radio access node 2300 includes a control system 2302 that includes one or more processors 2304 (e.g., Central Processing Units (CPUs), Application Specific Integrated Circuits (ASICs), Field Programmable Gate Arrays (FPGAs), and/or the like), memory 2306, and a network interface 2308. The one or more processors 2304 are also referred to herein as processing circuitry. In addition, the radio access node 2300 may include one or more radio units 2310 that each includes one or more transmitters 2312 and one or more receivers 2314 coupled to one or more antennas 2316. The radio units 2310 may be referred to or be part of radio interface circuitry. In some embodiments, the radio unit(s) 2310 is external to the control system 2302 and connected to the control system 2302 via, e.g., a wired connection (e.g., an optical cable). However, in some other embodiments, the radio unit(s) 2310 and potentially the antenna(s) 2316 are integrated together with the control system 2302. The one or more processors 2304 operate to provide one or more functions of a radio access node 2300 as described herein. In some embodiments, the function(s) are implemented in software that is stored, e.g., in the memory 2306 and executed by the one or more processors 2304.

Figure 24:
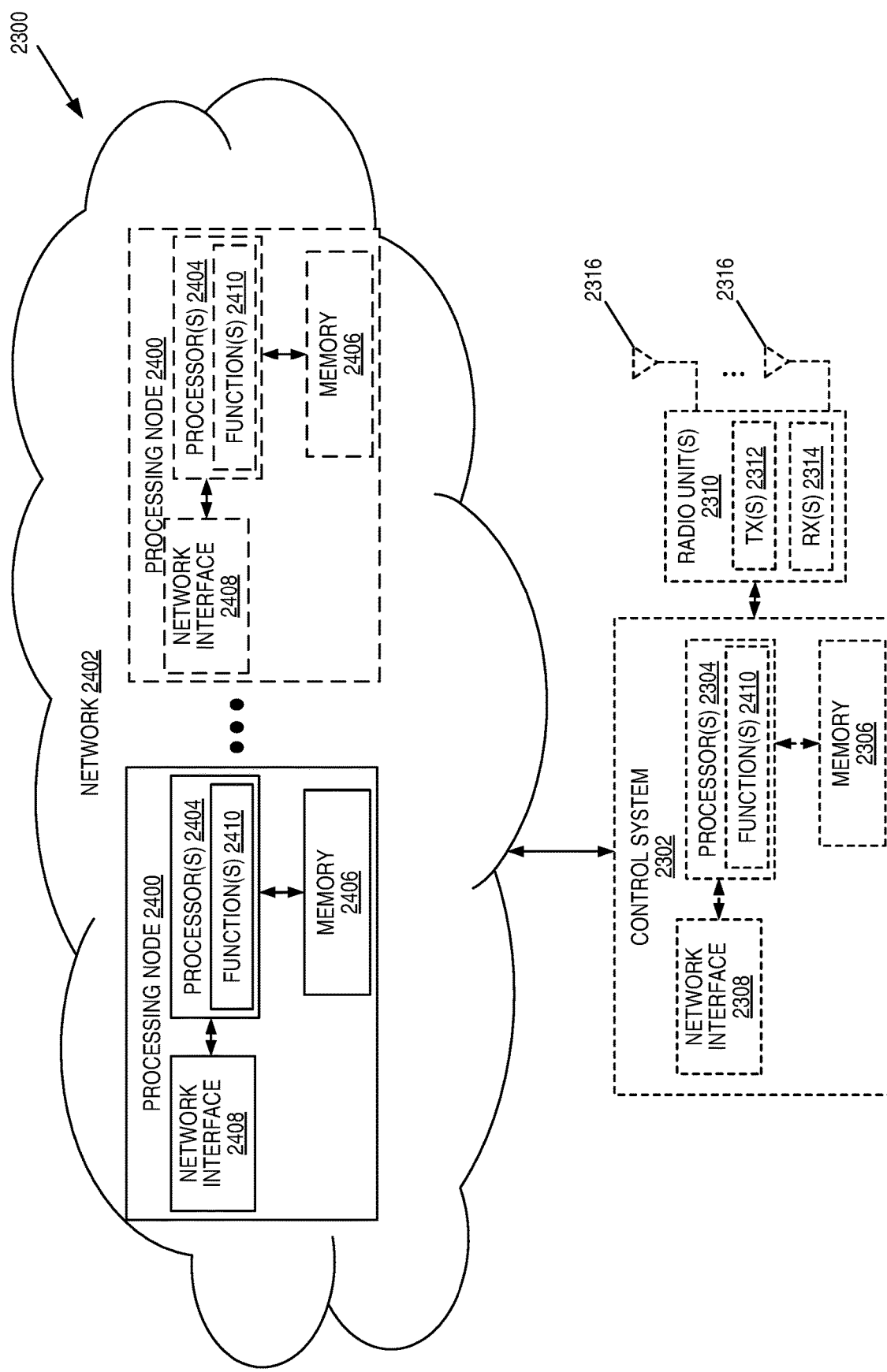
FIG. 24 is a schematic block diagram that illustrates a virtualized embodiment of the radio access node according to some embodiments of the present disclosure.

FIG. 24 is a schematic block diagram that illustrates a virtualized embodiment of the radio access node 2300 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 2300 in which at least a portion of the functionality of the radio access node 2300 is implemented as a virtual component(s) (e.g., via a virtual machine(s) executing on a physical processing node(s) in a network(s)). As illustrated, in this example, the radio access node 2300 may include the control system 2302 and/or the one or more radio units 2310, as described above. The control system 2302 may be connected to the radio unit(s) 2310 via, for example, an optical cable or the like. The radio access node 2300 includes one or more processing nodes 2400 coupled to or included as part of a network(s) 2402. If present, the control system 2302 or the radio unit(s) are connected to the processing node(s) 2400 via the network 2402. Each processing node 2400 includes one or more processors 2404 (e.g., CPUs, ASICs, FPGAS, and/or the like), memory 2406, and a network interface 2408.

In this example, functions 2410 of the radio access node 2300 described herein are implemented at the one or more processing nodes 2400 or distributed across the one or more processing nodes 2400 and the control system 2302 and/or the radio unit(s) 2310 in any desired manner. In some particular embodiments, some or all of the functions 2410 of the radio access node 2300 described herein are implemented as virtual components executed by one or more virtual machines implemented in a virtual environment(s) hosted by the processing node(s) 2400. As will be appreciated by one of ordinary skill in the art, additional signaling or communication between the processing node(s) 2400 and the control system 2302 is used in order to carry out at least some of the desired functions 2410. Notably, in some embodiments, the control system 2302 may not be included, in which case the radio unit(s) 2310 communicate directly with the processing node(s) 2400 via an appropriate network interface(s).

In some embodiments, a computer program including instructions which, when executed by at least one processor, causes the at least one processor to carry out the functionality of radio access node 2300 or a node (e.g., a processing node 2400) implementing one or more of the functions 2410 of the radio access node 2300 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 25:
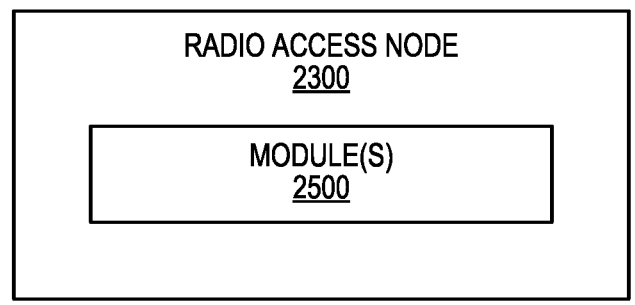
FIG. 25 is a schematic block diagram of the radio access node according to some other embodiments of the present disclosure.

FIG. 25 is a schematic block diagram of the radio access node 2300 according to some other embodiments of the present disclosure. The radio access node 2300 includes one or more modules 2500, each of which is implemented in software. The module(s) 2500 provide the functionality of the radio access node 2300 described herein. This discussion is equally applicable to the processing node 2400 of FIG. 24 where the modules 2500 may be implemented at one of the processing nodes 2400 or distributed across multiple processing nodes 2400 and/or distributed across the processing node(s) 2400 and the control system 2302.

Figure 26:
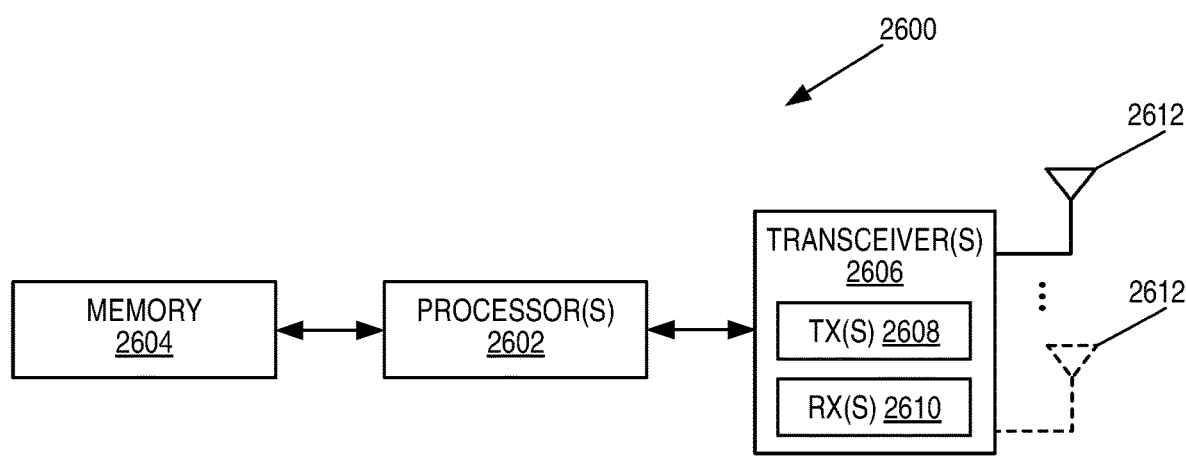
FIG. 26 is a schematic block diagram of a wireless communication device according to some embodiments of the present disclosure.

FIG. 26 is a schematic block diagram of a wireless communication device 2600 according to some embodiments of the present disclosure. As illustrated, the wireless communication device 2600 includes one or more processors 2602 (e.g., CPUs, ASICS, FPGAS, and/or the like), memory 2604, and one or more transceivers 2606 each including one or more transmitters 2608 and one or more receivers 2610 coupled to one or more antennas 2612. The transceiver(s) 2606 includes radio-front end circuitry connected to the antenna(s) 2612 that is configured to condition signals communicated between the antenna(s) 2612 and the processor(s) 2602, as will be appreciated by on of ordinary skill in the art. The processors 2602 are also referred to herein as processing circuitry. The transceivers 2606 are also referred to herein as radio circuitry. In some embodiments, the functionality of the wireless communication device 2600 described above may be fully or partially implemented in software that is, e.g., stored in the memory 2604 and executed by the processor(s) 2602. Note that the wireless communication device 2600 may include additional components not illustrated in FIG. 26 such as, e.g., one or more user interface components (e.g., an input/output interface including a display, buttons, a touch screen, a microphone, a speaker(s), and/or the like and/or any other components for allowing input of information into the wireless communication device 2600 and/or allowing output of information from the wireless communication device 2600), a power supply (e.g., a battery and associated power circuitry), etc.

In some embodiments, a computer program including instructions which, when executed by at least one processor, causes the at least one processor to carry out the functionality of the wireless communication device 2600 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 27:
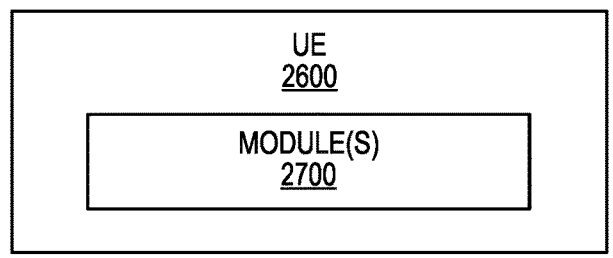
FIG. 27 is a schematic block diagram of the wireless communication device 1200 according to some other embodiments of the present disclosure.

FIG. 27 is a schematic block diagram of the wireless communication device 2600 according to some other embodiments of the present disclosure. The wireless communication device 2600 includes one or more modules 2700, each of which is implemented in software. The module(s) 2700 provide the functionality of the wireless communication device 2600 described herein.

Figure 28:
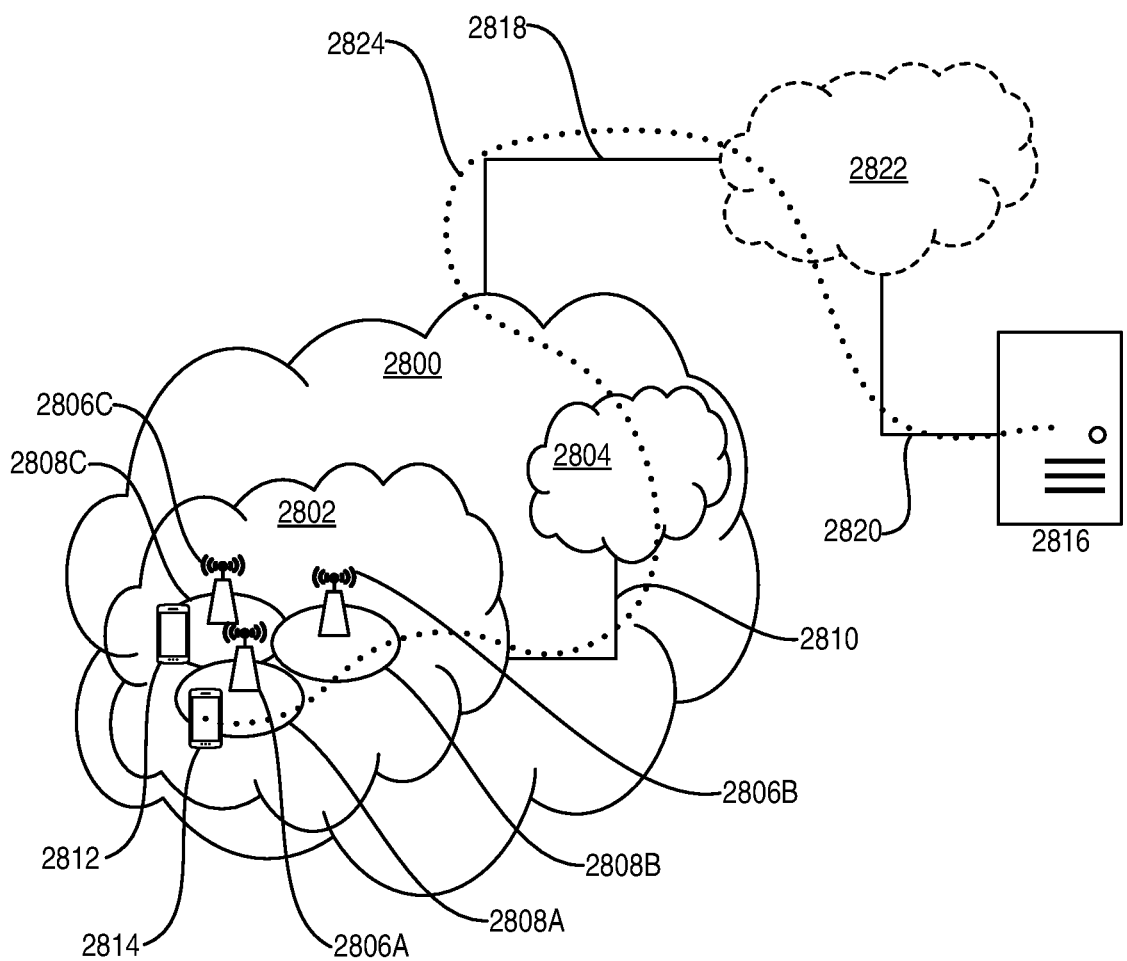
FIG. 28 illustrates a communication system includes a telecommunication network, such as a 3GPP-type cellular network, which comprises an access network, such as a Radio Access Network (RAN), and a core network according to some embodiments of the present disclosure.

With reference to FIG. 28, in accordance with an embodiment, a communication system includes a telecommunication network 2800, such as a 3GPP-type cellular network, which comprises an access network 2802, such as a RAN, and a core network 2804. The access network 2802 comprises a plurality of base stations 2806A, 2806B, 2806C, such as Node Bs, eNBs, gNBs, or other types of wireless Access Points (APs), each defining a corresponding coverage area 2808A, 2808B, 2808C. Each base station 2806A, 2806B, 2806C is connectable to the core network 2804 over a wired or wireless connection 2810. A first UE 2812 located in coverage area 2808C is configured to wirelessly connect to, or be paged by, the corresponding base station 2806C. A second UE 2814 in coverage area 2808A is wirelessly connectable to the corresponding base station 2806A. While a plurality of UEs 2812, 2814 are illustrated in this example, the disclosed embodiments are equally applicable to a situation where a sole UE is in the coverage area or where a sole UE is connecting to the corresponding base station 2806.

The telecommunication network 2800 is itself connected to a host computer 2816, which may be embodied in the hardware and/or software of a standalone server, a cloud-implemented server, a distributed server, or as processing resources in a server farm. The host computer 2816 may be under the ownership or control of a service provider, or may be operated by the service provider or on behalf of the service provider. Connections 2818 and 2820 between the telecommunication network 2800 and the host computer 2816 may extend directly from the core network 2804 to the host computer 2816 or may go via an optional intermediate network 2822. The intermediate network 2822 may be one of, or a combination of more than one of, a public, private, or hosted network; the intermediate network 2822, if any, may be a backbone network or the Internet; in particular, the intermediate network 2822 may comprise two or more sub-networks (not shown).

The communication system of FIG. 28 as a whole enables connectivity between the connected UEs 2812, 2814 and the host computer 2816. The connectivity may be described as an Over-the-Top (OTT) connection 2824. The host computer 2816 and the connected UEs 2812, 2814 are configured to communicate data and/or signaling via the OTT connection 2824, using the access network 2802, the core network 2804, any intermediate network 2822, and possible further infrastructure (not shown) as intermediaries. The OTT connection 2824 may be transparent in the sense that the participating communication devices through which the OTT connection 2824 passes are unaware of routing of uplink and downlink communications. For example, the base station 2806 may not or need not be informed about the past routing of an incoming downlink communication with data originating from the host computer 2816 to be forwarded (e.g., handed over) to a connected UE 2812. Similarly, the base station 2806 need not be aware of the future routing of an outgoing uplink communication originating from the UE 2812 towards the host computer 2816.

Example implementations, in accordance with an embodiment, of the UE, base station, and host computer discussed in the preceding paragraphs will now be described with reference to FIG. 29. In a communication system 2900, a host computer 2902 comprises hardware 2904 including a communication interface 2906 configured to set up and maintain a wired or wireless connection with an interface of a different communication device of the communication system 2900. The host computer 2902 further comprises processing circuitry 2908, which may have storage and/or processing capabilities. In particular, the processing circuitry 2908 may comprise one or more programmable processors, ASICs, FPGAs, or combinations of these (not shown) adapted to execute instructions. The host computer 2902 further comprises software 2910, which is stored in or accessible by the host computer 2902 and executable by the processing circuitry 2908. The software 2910 includes a host application 2912. The host application 2912 may be operable to provide a service to a remote user, such as a UE 2914 connecting via an OTT connection 2916 terminating at the UE 2914 and the host computer 2902. In providing the service to the remote user, the host application 2912 may provide user data which is transmitted using the OTT connection 2916.

The communication system 2900 further includes a base station 2918 provided in a telecommunication system and comprising hardware 2920 enabling it to communicate with the host computer 2902 and with the UE 2914. The hardware 2920 may include a communication interface 2922 for setting up and maintaining a wired or wireless connection with an interface of a different communication device of the communication system 2900, as well as a radio interface 2924 for setting up and maintaining at least a wireless connection 2926 with the UE 2914 located in a coverage area (not shown in FIG. 29) served by the base station 2918. The communication interface 2922 may be configured to facilitate a connection 2928 to the host computer 2902. The connection 2928 may be direct or it may pass through a core network (not shown in FIG. 29) of the telecommunication system and/or through one or more intermediate networks outside the telecommunication system. In the embodiment shown, the hardware 2920 of the base station 2918 further includes processing circuitry 2930, which may comprise one or more programmable processors, ASICS, FPGAs, or combinations of these (not shown) adapted to execute instructions. The base station 2918 further has software 2932 stored internally or accessible via an external connection.

The communication system 2900 further includes the UE 2914 already referred to. The UE's 2914 hardware 2934 may include a radio interface 2936 configured to set up and maintain a wireless connection 2926 with a base station serving a coverage area in which the UE 2914 is currently located. The hardware 2934 of the UE 2914 further includes processing circuitry 2938, which may comprise one or more programmable processors, ASICs, FPGAs, or combinations of these (not shown) adapted to execute instructions. The UE 2914 further comprises software 2940, which is stored in or accessible by the UE 2914 and executable by the processing circuitry 2938. The software 2940 includes a client application 2942. The client application 2942 may be operable to provide a service to a human or non-human user via the UE 2914, with the support of the host computer 2902. In the host computer 2902, the executing host application 2912 may communicate with the executing client application 2942 via the OTT connection 2916 terminating at the UE 2914 and the host computer 2902. In providing the service to the user, the client application 2942 may receive request data from the host application 2912 and provide user data in response to the request data. The OTT connection 2916 may transfer both the request data and the user data. The client application 2942 may interact with the user to generate the user data that it provides.

Figure 29:
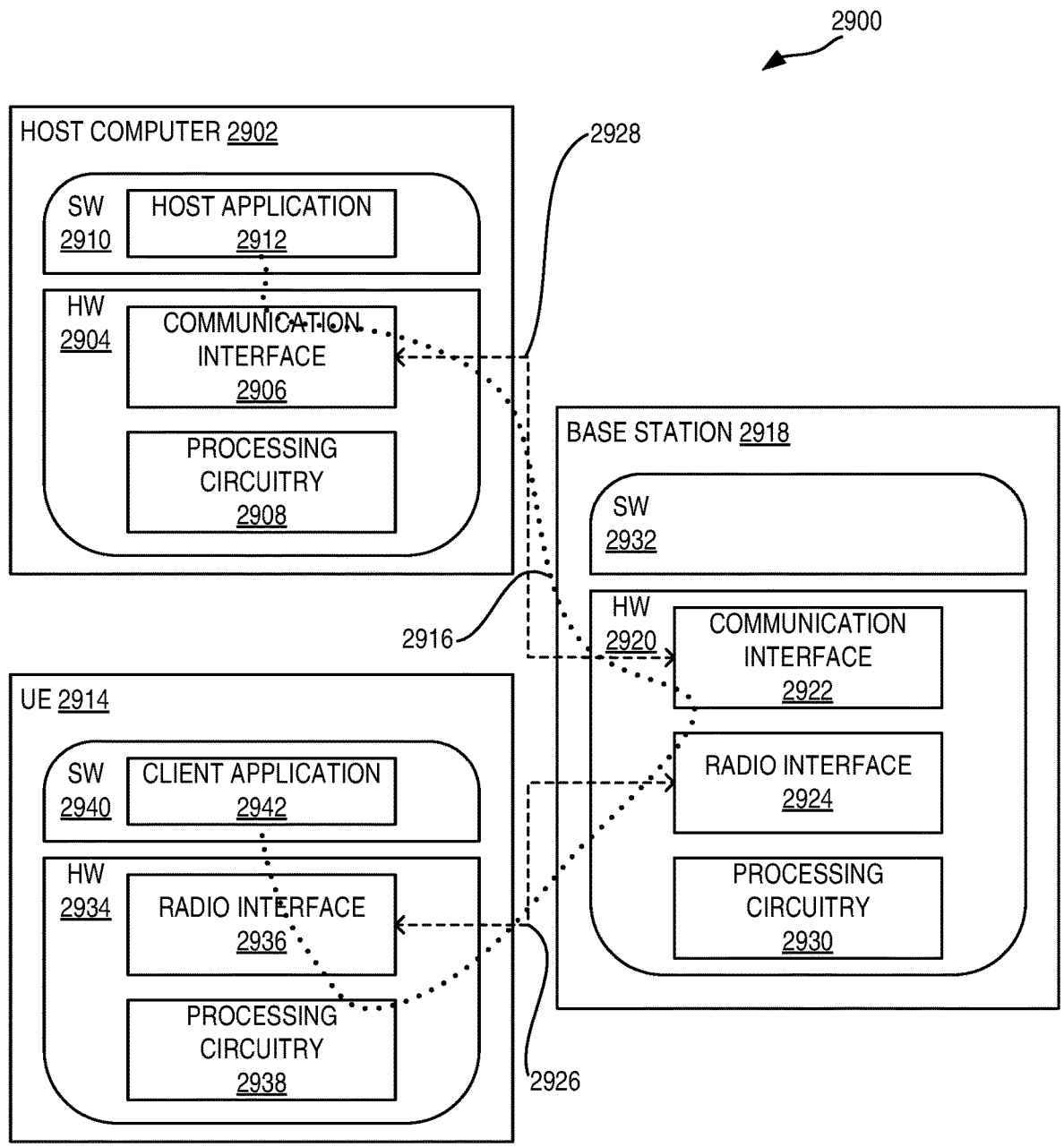
FIG. 29 illustrates a communication system including a host computer according to some embodiments of the present disclosure.

It is noted that the host computer 2902, the base station 2918, and the UE 2914 illustrated in FIG. 29 may be similar or identical to the host computer 2816, one of the base stations 2806A, 2806B, 2806C, and one of the UEs 2812, 2814 of FIG. 28, respectively. This is to say, the inner workings of these entities may be as shown in FIG. 29 and independently, the surrounding network topology may be that of FIG. 28.

In FIG. 29, the OTT connection 2916 has been drawn abstractly to illustrate the communication between the host computer 2902 and the UE 2914 via the base station 2918 without explicit reference to any intermediary devices and the precise routing of messages via these devices. The network infrastructure may determine the routing, which may be configured to hide from the UE 2914 or from the service provider operating the host computer 2902, or both. While the OTT connection 2916 is active, the network infrastructure may further take decisions by which it dynamically changes the routing (e.g., on the basis of load balancing consideration or reconfiguration of the network).

The wireless connection 2926 between the UE 2914 and the base station 2918 is in accordance with the teachings of the embodiments described throughout this disclosure. One or more of the various embodiments improve the performance of OTT services provided to the UE 2914 using the OTT connection 2916, in which the wireless connection 2926 forms the last segment. More precisely, the teachings of these embodiments may improve the e.g., data rate, latency, power consumption, etc. and thereby provide benefits such as e.g., reduced user waiting time, relaxed restriction on file size, better responsiveness, extended battery lifetime, etc.

A measurement procedure may be provided for the purpose of monitoring data rate, latency, and other factors on which the one or more embodiments improve. There may further be an optional network functionality for reconfiguring the OTT connection 2916 between the host computer 2902 and the UE 2914, in response to variations in the measurement results. The measurement procedure and/or the network functionality for reconfiguring the OTT connection 2916 may be implemented in the software 2910 and the hardware 2904 of the host computer 2902 or in the software 2940 and the hardware 2934 of the UE 2914, or both. In some embodiments, sensors (not shown) may be deployed in or in association with communication devices through which the OTT connection 2916 passes; the sensors may participate in the measurement procedure by supplying values of the monitored quantities exemplified above, or supplying values of other physical quantities from which the software 2910, 2940 may compute or estimate the monitored quantities. The reconfiguring of the OTT connection 2916 may include message format, retransmission settings, preferred routing, etc.; the reconfiguring need not affect the base station 2918, and it may be unknown or imperceptible to the base station 2918. Such procedures and functionalities may be known and practiced in the art. In certain embodiments, measurements may involve proprietary UE signaling facilitating the host computer 2902's measurements of throughput, propagation times, latency, and the like. The measurements may be implemented in that the software 2910 and 2940 causes messages to be transmitted, in particular empty or 'dummy' messages, using the OTT connection 2916 while it monitors propagation times, errors, etc.

Figures 30, 31:
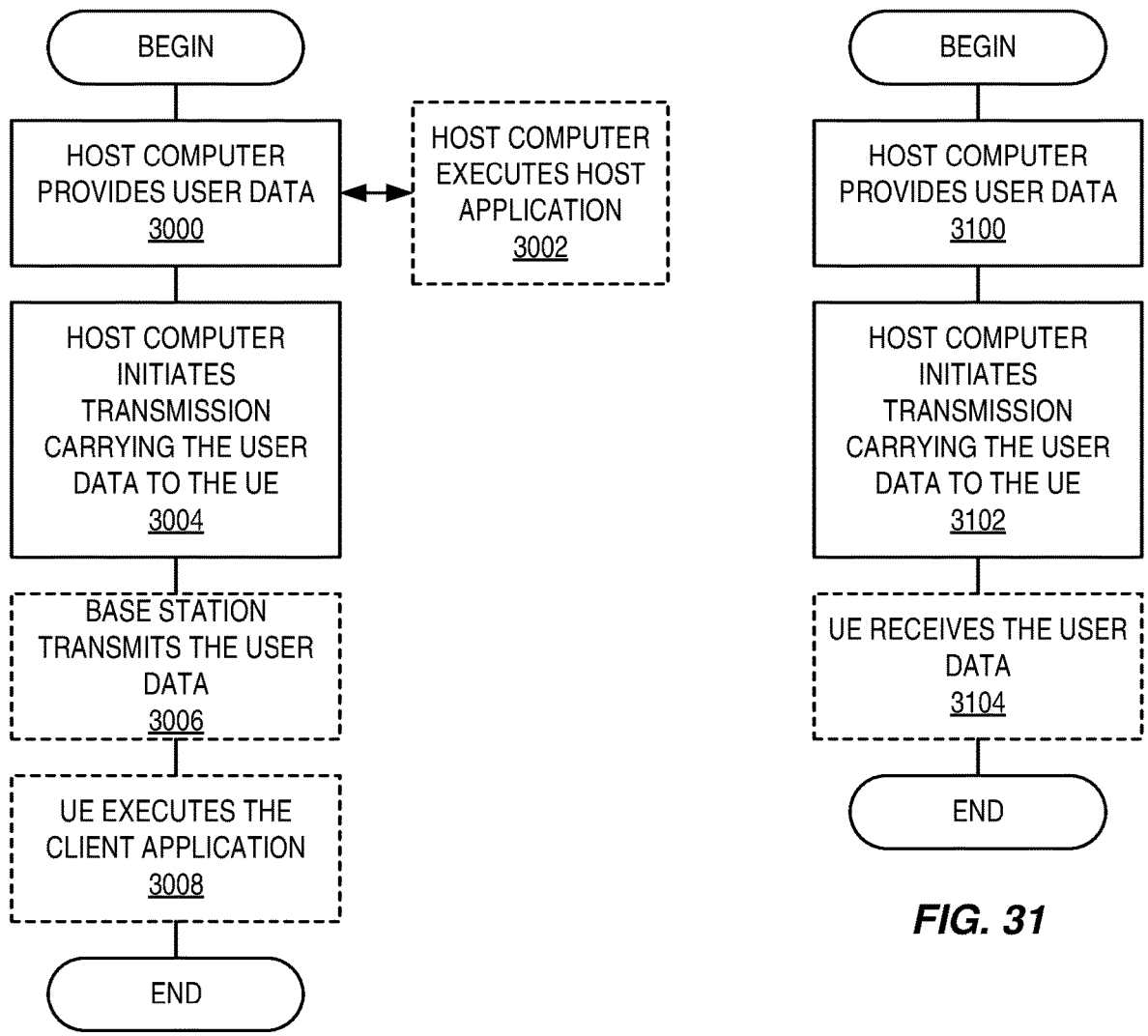

FIG. 30 is a flowchart illustrating a method implemented in a communication system, in accordance with one embodiment. The communication system includes a host computer, a base station, and a UE which may be those described with reference to FIGS. 28 and 29. For simplicity of the present disclosure, only drawing references to FIG. 30 will be included in this section. In step 3000, the host computer provides user data. In sub-step 3002 (which may be optional) of step 3000, the host computer provides the user data by executing a host application. In step 3004, the host computer initiates a transmission carrying the user data to the UE. In step 3006 (which may be optional), the base station transmits to the UE the user data which was carried in the transmission that the host computer initiated, in accordance with the teachings of the embodiments described throughout this disclosure. In step 3008 (which may also be optional), the UE executes a client application associated with the host application executed by the host computer.

FIG. 31 is a flowchart illustrating a method implemented in a communication system, in accordance with one embodiment. The communication system includes a host computer, a base station, and a UE which may be those described with reference to FIGS. 28 and 29. For simplicity of the present disclosure, only drawing references to FIG. 31 will be included in this section. In step 3100 of the method, the host computer provides user data. In an optional sub-step (not shown) the host computer provides the user data by executing a host application. In step 3102, the host computer initiates a transmission carrying the user data to the UE. The transmission may pass via the base station, in accordance with the teachings of the embodiments described throughout this disclosure. In step 3104 (which may be optional), the UE receives the user data carried in the transmission.

FIG. 32 is a flowchart illustrating a method implemented in a communication system, in accordance with one embodiment. The communication system includes a host computer, a base station, and a UE which may be those described with reference to FIGS. 28 and 29. For simplicity of the present disclosure, only drawing references to FIG. 32 will be included in this section. In step 3200 (which may be optional), the UE receives input data provided by the host computer. Additionally or alternatively, in step 3202, the UE provides user data. In sub-step 3204 (which may be optional) of step 3200, the UE provides the user data by executing a client application. In sub-step 3206 (which may be optional) of step 3202, the UE executes a client application which provides the user data in reaction to the received input data provided by the host computer. In providing the user data, the executed client application may further consider user input received from the user. Regardless of the specific manner in which the user data was provided, the UE initiates, in sub-step 3208 (which may be optional), transmission of the user data to the host computer. In step 3210 of the method, the host computer receives the user data transmitted from the UE, in accordance with the teachings of the embodiments described throughout this disclosure.

FIG. 33 is a flowchart illustrating a method implemented in a communication system, in accordance with one embodiment. The communication system includes a host computer, a base station, and a UE which may be those described with reference to FIGS. 28 and 29. For simplicity of the present disclosure, only drawing references to FIG. 33 will be included in this section. In step 3300 (which may be optional), in accordance with the teachings of the embodiments described throughout this disclosure, the base station receives user data from the UE. In step 3302 (which may be optional), the base station initiates transmission of the received user data to the host computer. In step 3304 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

EMBODIMENTS

Group A Embodiments

Embodiment 1: A method performed by a wireless device for enabling power control of multiple Transmission Reception Points, TRPs, the method comprising at least one of: receiving (1300) multiple Physical Uplink Control Channel, PUCCH, Transmit Power Control, TPC, commands, each of the TPC commands is associated with one of the TRPs; receiving (1302) multiple Physical Uplink Shared Channel, PUSCH, TPC commands, each of the TPC commands is associated with one of the TRPs; receiving (1304) in a Downlink Control Information, DCI, a first TPC command and a second TPC command and a first spatial relation and a second spatial relation for a first Uplink, UL, transmission and a second UL transmission, respectively; estimating (1306) a first transmit power and a second transmit power based on the first spatial relation and the second spatial relation, respectively; and applying (1308) the first transmit power and the second transmit power to the first UL transmission and the second UL transmission, respectively.

Embodiment 2: The method of any of the previous embodiments wherein the multiple TRPs are identified by spatial relations and/or Sounding Reference Signal, SRS, Resource Indicators, SRIs, or Transmission Configuration Indicator, TCI, states.

Embodiment 3: The method of any of the previous embodiments wherein receiving the multiple PUCCH TPC commands comprises receiving the multiple PUCCH TPC commands in a DL DCI triggering multiple PUCCH transmissions towards multiple TRPs.

Embodiment 4: The method of any of the previous embodiments wherein receiving the multiple PUSCH TPC commands comprises receiving the multiple PUSCH TPC commands in a UL DCI scheduling multiple PUSCH transmissions towards multiple TRPS.

Embodiment 5: The method of any of the previous embodiments wherein the first and the second spatial relations are associated with a first and a second DL or UL reference signals.

Embodiment 6: The method of any of the previous embodiments wherein the first and the second DL or UL reference signals are one of a CSI-RS, SSB, or SRS.

Embodiment 7: The method of any of the previous embodiments wherein the first and the second DL or UL reference signals are different.

Embodiment 8: The method of any of the previous embodiments wherein the DCI is a DL DCI of one of DCI format 1_1 or DCI format 1_Embodiment 2:

Embodiment 9: The method of any of the previous embodiments wherein the first and the second UL transmissions are respectively a first and a second PUCCH transmissions.

Embodiment 10: The method of any of the previous embodiments wherein the first and the second spatial relations are associated with one or more PUCCH resource.

Embodiment 11: The method of any of the previous embodiments wherein the DCI is a UL DCI of one of DCI format 0_1 or DCI format 0_Embodiment 2:

Embodiment 12: The method of any of the previous embodiments wherein the first and the second UL transmissions are respectively a first and a second PUSCH transmissions.

Embodiment 13: The method of any of the previous embodiments wherein the first and the second spatial relations are associated with respectively a first and a second SRIs indicated in the DCI.

Embodiment 14: The method of any of the previous embodiments wherein the method further comprises calculating a first and a second PHRs based on the first and the second transmit powers, respectively, and reporting one of the first PHR, the second PHR, the maximum of the first and the second PHRs, and the minimum of the first and the second PHRs, or both the first and the second PHRs in a PHR report in the first and the second PUSCH transmissions.

Embodiment 15: The method of any of the previous embodiments wherein the first and the second spatial relations are associated with respectively a first and a second UL TCI states indicated in the DCI.

Embodiment 16: The method of any of the previous embodiments wherein the first and the second spatial relations are associated with a first and a second sets of power control parameters, respectively.

Embodiment 17: The method of any of the previous embodiments wherein the estimating the first and the second transmit powers comprises calculating a first and a second open loop power adjustments based on respectively the first and the second set of power control parameters, and a first and a second closed loop power adjustments based on respectively the first and the second TPC commands.

Embodiment 18: The method of any of the previous embodiments wherein the first and the second spatial relations are associated with a first and a second TRP, respectively.

Embodiment 19: The method of any of the previous embodiments wherein the first and a second TPC commands are jointly encoded.

Embodiment 20: The method of any of the previous embodiments wherein the number of TPC commands in the DCI is determined based on one or more of the group consisting of: the number of TCI states indicated in the DCI; the number of TPC command fields in the DCI is determined by the maximum number of spatial relations (or UL TCI states) activated for all PUCCH resources configured in the corresponding BWP of a UL carrier; the number of SRIs (or UL TCI states) indicated in the DCI; the maximum number of SRIs (or UL TCI states) associated with PUSCH transmissions configured in the corresponding BWP of a UL carrier.

Embodiment 21: The method of any of the previous embodiments wherein closed loops associated with different TRPs are jointly indexed.

Embodiment 22: The method of any of the previous embodiments wherein, for group based TPC commands in DCI format 2_2 and/or DCI format 2_3, each block for the wireless device can include one or more TPC commands and the associated closed loop indicators.

Embodiment 23: The method of any of the previous embodiments wherein the number of bits for the closed loop indicator is based on the maximum number of closed loops configured for the corresponding PUSCH, PUCCH, or SRS.

Embodiment 24: The method of any of the previous embodiments wherein, when a PHR report is based on actual PUSCH and is carried on a PUSCH which is repeated towards multiple TRPs, multiple PHRs are calculated.

Embodiment 25: The method of any of the previous embodiments wherein each calculated PHR based one PUSCH occasion to a TRP; and reporting at least one of: the minimum, the maximum, or the average of the multiple calculated PHRs.

Embodiment 26: The method of any of the previous embodiments, further comprising: providing user data; and forwarding the user data to a host computer via the transmission to the base station.

Group B Embodiments

Embodiment 27: A method performed by a base station for enabling power control of multiple Transmission Reception Points, TRPs, the method comprising at least one of: transmitting (1400), to a wireless device, multiple PUCCH TPC commands, each of the TPC commands is associated with one of the TRPs; transmitting (1402), to the wireless device, multiple PUSCH TPC commands, each of the TPC commands is associated with one of the TRPs; transmitting (1404), to the wireless device, in a DCI a first TPC command and a second TPC command and a first spatial relation and a second spatial relation for a first UL transmission and a second UL transmission, respectively; estimating (1406) a first transmit power and a second transmit power based on the first spatial relation and the second spatial relation, respectively; and receiving (1408) the first UL transmission and the second UL transmission with the first transmit power and the second transmit power, respectively.

Embodiment 28: The method of any of the previous embodiments wherein the multiple TRPs are identified by spatial relations and/or Sounding Reference Signal, SRS, Resource Indicators, SRIs, or Transmission Configuration Indicator, TCI, states.

Embodiment 29: The method of any of the previous embodiments wherein transmitting the multiple PUCCH TPC commands comprises transmitting the multiple PUCCH TPC commands in a DL DCI triggering multiple PUCCH transmissions towards multiple TRPs.

Embodiment 30: The method of any of the previous embodiments wherein transmitting the multiple PUSCH TPC commands comprises transmitting the multiple PUSCH TPC commands in a UL DCI scheduling multiple PUSCH transmissions towards multiple TRPs.

Embodiment 31: The method of any of the previous embodiments wherein the first and the second spatial relations are associated with a first and a second DL or UL reference signals.

Embodiment 32: The method of any of the previous embodiments wherein the first and the second DL or UL reference signals are one of a CSI-RS, SSB, or SRS.

Embodiment 33: The method of any of the previous embodiments wherein the first and the second DL or UL reference signals are different.

Embodiment 34: The method of any of the previous embodiments wherein the DCI is a DL DCI of one of DCI format 1_1 or DCI format 1_Embodiment 2:

Embodiment 35: The method of any of the previous embodiments wherein the first and the second UL transmissions are respectively a first and a second PUCCH transmission.

Embodiment 36: The method of any of the previous embodiments wherein the first and the second spatial relations are associated with one or more PUCCH resource.

Embodiment 37: The method of any of the previous embodiments wherein the DCI is a UL DCI of one of DCI format 0_1 or DCI format 0_Embodiment 2:

Embodiment 38: The method of any of the previous embodiments wherein the first and the second UL transmissions are respectively a first and a second PUSCH transmission.

Embodiment 39: The method of any of the previous embodiments wherein the first and the second spatial relations are associated with respectively a first and a second SRIs indicated in the DCI.

Embodiment 40: The method of any of the previous embodiments wherein the method further comprises a first and a second PHRs being calculated based on the first and the second transmit powers, respectively, and receiving one of the first PHR, the second PHR, the maximum of the first and the second PHRs, and the minimum of the first and the second PHRs, or both the first and the second PHRs in a PHR report in the first and the second PUSCH transmissions.

Embodiment 41: The method of any of the previous embodiments wherein the first and the second spatial relations are associated with respectively a first and a second UL TCI states indicated in the DCI.

Embodiment 42: The method of any of the previous embodiments wherein the first and the second spatial relations are associated with a first and a second set of power control parameters, respectively.

Embodiment 43: The method of any of the previous embodiments wherein the estimating the first and the second transmit powers comprises calculating a first and a second open loop power adjustments based on respectively the first and the second set of power control parameters, and a first and a second closed loop power adjustments based on respectively the first and the second TPC commands.

Embodiment 44: The method of any of the previous embodiments wherein the first and the second spatial relations are associated with a first and a second TRP, respectively.

Embodiment 45: The method of any of the previous embodiments wherein the first and a second TPC commands are jointly encoded.

Embodiment 46: The method of any of the previous embodiments wherein the number of TPC commands in the DCI is determined based on one or more of the group consisting of: the number of TCI states indicated in the DCI; the number of TPC command fields in the DCI is determined by the maximum number of spatial relations (or UL TCI states) activated for all PUCCH resources configured in the corresponding BWP of a UL carrier; the number of SRIs (or UL TCI states) indicated in the DCI; the maximum number of SRIs (or UL TCI states) associated with PUSCH transmissions configured in the corresponding BWP of a UL carrier.

Embodiment 47: The method of any of the previous embodiments wherein closed loops associated with different TRPs are jointly indexed.

Embodiment 48: The method of any of the previous embodiments wherein, for group based TPC commands in DCI format 2_2 and/or DCI format 2_3, each block for the wireless device can include one or more TPC commands and the associated closed loop indicators.

Embodiment 49: The method of any of the previous embodiments wherein the number of bits for the closed loop indicator is based on the maximum number of closed loops configured for the corresponding PUSCH, PUCCH, or SRS.

Embodiment 50: The method of any of the previous embodiments wherein, when a PHR report is based on actual PUSCH and is carried on a PUSCH which is repeated towards multiple TRPs, multiple PHRs are calculated.

Embodiment 51: The method of any of the previous embodiments wherein each calculated PHR based one PUSCH occasion to a TRP; and reporting at least one of: the minimum, the maximum, or the average of the multiple calculated PHRs.

Embodiment 52: The method of any of the previous embodiments, further comprising: obtaining user data; and forwarding the user data to a host computer or a wireless device.

Group C Embodiments

Embodiment 53: A wireless device for enabling power control of multiple Transmission Reception Points, TRPs, the wireless device comprising: processing circuitry configured to perform any of the steps of any of the Group A embodiments; and power supply circuitry configured to supply power to the wireless device.

Embodiment 54: A base station for enabling power control of multiple Transmission Reception Points, TRPs, the base station comprising: processing circuitry configured to perform any of the steps of any of the Group B embodiments; and power supply circuitry configured to supply power to the base station.

Embodiment 55: A User Equipment, UE, for enabling power control of multiple Transmission Reception Points, TRPs, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 56: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 57: The communication system of the previous embodiment further including the base station.

Embodiment 58: The communication system of the previous 2 embodiments, further including the UE, wherein the UE is configured to communicate with the base station.

Embodiment 59: The communication system of the previous 3 embodiments, wherein: the processing circuitry of the host computer is configured to execute a host application, thereby providing the user data; and the UE comprises processing circuitry configured to execute a client application associated with the host application.

Embodiment 60: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 61: The method of the previous embodiment, further comprising, at the base station, transmitting the user data.

Embodiment 62: The method of the previous 2 embodiments, wherein the user data is provided at the host computer by executing a host application, the method further comprising, at the UE, executing a client application associated with the host application.

Embodiment 63: A User Equipment, UE, configured to communicate with a base station, the UE comprising a radio interface and processing circuitry configured to perform the method of the previous 3 embodiments.

Embodiment 64: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 65: The communication system of the previous embodiment, wherein the cellular network further includes a base station configured to communicate with the UE.

Embodiment 66: The communication system of the previous 2 embodiments, wherein: the processing circuitry of the host computer is configured to execute a host application, thereby providing the user data; and the UE's processing circuitry is configured to execute a client application associated with the host application.

Embodiment 67: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 68: The method of the previous embodiment, further comprising at the UE, receiving the user data from the base station.

Embodiment 69: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 70: The communication system of the previous embodiment, further including the UE.

Embodiment 71: The communication system of the previous 2 embodiments, further including the base station, wherein the base station comprises a radio interface configured to communicate with the UE and a communication interface configured to forward to the host computer the user data carried by a transmission from the UE to the base station.

Embodiment 72: The communication system of the previous 3 embodiments, wherein: the processing circuitry of the host computer is configured to execute a host application; and the UE's processing circuitry is configured to execute a client application associated with the host application, thereby providing the user data.

Embodiment 73: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 74: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 75: The method of the previous embodiment, further comprising, at the UE, providing the user data to the base station.

Embodiment 76: The method of the previous 2 embodiments, further comprising: at the UE, executing a client application, thereby providing the user data to be transmitted; and at the host computer, executing a host application associated with the client application.

Embodiment 77: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 78: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 79: The communication system of the previous embodiment further including the base station.

Embodiment 80: The communication system of the previous 2 embodiments, further including the UE, wherein the UE is configured to communicate with the base station.

Embodiment 81: The communication system of the previous 3 embodiments, wherein: the processing circuitry of the host computer is configured to execute a host application; and the UE is configured to execute a client application associated with the host application, thereby providing the user data to be received by the host computer.

Embodiment 82: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 83: The method of the previous embodiment, further comprising at the base station, receiving the user data from the UE.

Embodiment 84: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).
3GPP Third Generation Partnership Project
5G Fifth Generation
5GC Fifth Generation Core
5GS Fifth Generation System
AF Application Function
AMF Access and Mobility Function
AN Access Network
AP Access Point
ASIC Application Specific Integrated Circuit
AUSF Authentication Server Function
BWP Bandwidth Part
CE Control Element
CG Configured Grant
CORESET Control Resource Set
CP Cyclic Prefix
CP-OFDM Cyclic Prefix Orthogonal Frequency Division Multiplexing CPU Central Processing Unit
CSI-RS Channel State Information Reference Signal
DCI Downlink Control Information
DFT Discrete Fourier Transform
DL Downlink
DMRS Demodulation Reference Signal
DN Data Network
DSP Digital Signal Processor
eNB Enhanced or Evolved Node B
FPGA Field Programmable Gate Array
FR1 Frequency Range 1
FR2 Frequency Range 2
gNB New Radio Base Station
gNB-CU New Radio Base Station Central Unit
gNB-DU New Radio Base Station Distributed Unit
HARQ Hybrid Automatic Repeat Request
HSS Home Subscriber Server
ID Identity
IE Information Element
IoT Internet of Things
IP Internet Protocol
LTE Long Term Evolution
MAC Medium Access Control
MCS Modulation and Coding Scheme
MME Mobility Management Entity
MTC Machine Type Communication
M-TRP Multi Transmission Reception Point
NEF Network Exposure Function
NF Network Function
NG-RAN Next Generation Radio Access Network
NR New Radio
NRF Network Function Repository Function
NSSF Network Slice Selection Function
OFDM Orthogonal Frequency Division Multiplexing
OTT Over-the-Top
PBCH Physical Broadcast Channel
PC Personal Computer
PCF Policy Control Function
PDCCH Physical Downlink Control Channel
PDSCH Physical Downlink Shared Channel
P-GW Packet Data Network Gateway
PHR Power Headroom
PUSCH Physical Uplink Shared Channel
QCL Quadi Co-Located
QoS Quality of Service
RAM Random Access Memory
RAN Radio Access Network
RB Resource Block
RE Resource Element
RF Radio Frequency
RTI Radio Network Temporary Identifier
ROM Read Only Memory
RRC Radio Resource Control
RRH Remote Radio Head
RS Reference Signal
RTT Round Trip Time
Rx Receive
SCEF Service Capability Exposure Function
SMF Session Management Function
SPS Semi-Persistently Scheduled
SRI Signal Resource Indicator
SRS Sounding Reference Signal
SS Synchronization Signal
SSB Synchronization Signal Block
TCI Transmission Configuration Indicator
TP Transmission Point
TPC Transmit Power Control
TRP Transmission Reception Point
TRS Tracking Reference Signal
UDM Unified Data Management
UE User Equipment
UL Uplink
UPF User Plane Function
URLLC Ultra Reliable Low Latency Communication Those skilled in the art will recognize improvements and modifications to the embodiments of the present disclosure. All such improvements and modifications are considered within the scope of the concepts disclosed herein.

The invention claimed is:

1. A method performed by a wireless device for enabling per Transmission Reception Point, TRP, Uplink, UL, power control for a UL physical channel to be transmitted to multiple TRPs, the method comprising:
    receiving in a Downlink Control Information, DCI, a first Transmit Power Control, TPC, command and a second TPC command and an indication of a first transmission of the physical channel to a first TRP associated with a first closed-loop and a second transmission of the physical channel to a second TRP associated with a second closed-loop;
    determining a first transmit power and a second transmit power based on the first and the second TPC commands, respectively;
    applying the first transmit power and the second transmit power to the first UL transmission and the second UL transmission, respectively;
    calculating a first and a second Power Headrooms, PHs, based on the first and the second transmit powers, respectively; and
    reporting one of the first PH, the second PH, the maximum of the first and the second PHs, the minimum of the first and the second PHs, an average of the first and the second PHs, and both the first and the second PHs in a Power Headroom Report, PHR, carried in the first and the second UL transmissions.

2. The method of claim 1 wherein the physical channel can be one of a Physical Uplink Shared Channel, PUSCH, and a Physical Uplink Control Channel, PUCCH.

3. The method of claim 1 wherein the first and second TPC commands indicate power adjustments associated with the first and second closed-loops, respectively.

4. The method of claim 1 wherein each of the first and second TRPs is identified by a spatial relation, a Sounding Reference Signal, SRS, Resource Indicator, SRI, or a Transmission Configuration Indicator, TCI, state.

5. The method of claim 1 wherein the DCI is a DL DCI scheduling a Physical Downlink Shared Channel, PDSCH, and the DCI also indicates a PUCCH resource for carrying a Hybrid Automatic Repeat Request Acknowledgment, HARQ-ACK, associated with the PDSCH, where the PUCCH resource is activated with a first and a second spatial relations.

6. The method of claim 1 wherein the first and second spatial relations are associated with the first and second TRPs, respectively, and the first and second transmissions are PUCCH transmissions.

7. The method of claim 1 wherein the first and second closed-loop indices are indicated in the first and second spatial relations, respectively.

8. The method of claim 1 wherein the DCI is a UL DCI scheduling a PUSCH and the first and a second transmissions are PUSCH transmissions.

9. The method of claim 1 wherein the UL DCI comprises a first and second SRIs, associated with the first and second TRPs, respectively.

10. The method of claim 1 wherein the first and second closed-loop indices are indicated through the first and second SRIs, respectively.

11. The method of claim 1 wherein the first and the second spatial relations are associated with a first and a second DL or UL reference signals.

12. The method of claim 11 wherein the first and the second DL or UL reference signals are one of a CSI-RS, SSB, or SRS.

13. The method of claim 11 wherein the first and the second DL or UL reference signals are different.

14. The method of claim 1 wherein the DCI is a DL DCI of one of DCI format 1_1 or DCI format 1_2.

15. The method of claim 1 wherein the first and the second UL transmissions are respectively a first and a second PUCCH transmissions.

16. The method of claim 1 wherein the first and the second spatial relations are associated with one or more PUCCH resources.

17. The method of claim 1 wherein the DCI is a UL DCI of one of DCI format 0_1 or DCI format 0_2.

18. The method of claim 1 wherein the first and the second UL transmissions are respectively a first and a second PUSCH transmissions.

19. The method of claim 1 wherein the first and the second spatial relations are associated with respectively a first and a second SRIs indicated in the DCI.

20. The method of claim 1 wherein the first and the second transmissions are associated with respectively a first and a second UL TCI states indicated in the DCI.

21. The method of claim 1 wherein the first and the second transmissions are associated with a first and a second sets of power control parameters, respectively.

22. The method of claim 1 wherein the first and second sets of power control parameters are configured for the first and second spatial relations, SRIs, or TCI states, respectively.

23. A method performed by a base station for enabling per Transmission Reception Point, TRP, uplink, UL, power control of a UL physical channel to be transmitted towards multiple TRPs by a wireless device, the method comprising:
transmitting, to the wireless device, a configuration of a first and a second power control closed-loops associated with a first and a second TRPs, respectively;
transmitting, to the wireless device, in a DCI a first Transmit Power Control, TPC, command and a second TPC command and an indication of a first UL transmission of the physical channel to the first TRP and a second UL transmission of the physical channel to the second TRP, respectively;
receiving the first UL transmission with a first transmit power at the first TRP and the second UL transmission with a second transmit power at the second TRP; and
receiving one of a first Power Headroom, PH, calculated based on the first transmit power, a second PH calculated based on the second transmit power, the maximum of the first and the second PHs, the minimum of the first and the second PHs, an average of the first and the second PHs, and both the first and the second PHs in a Power Headroom Report, PHR, carried in the first and the second UL transmissions.

24. A wireless device for enabling power control of multiple Transmission Reception Points, TRPs, comprising:
one or more transmitters;
one or more receivers; and
processing circuitry associated with the one or more transmitters and the one or more receivers, the processing circuitry configured to cause the wireless device to:
receive in a Downlink Control Information, DCI, a first Transmit Power Control, TPC, command and a second TPC command and an indication of a first Uplink, UL, transmission of the physical channel to a first TRP associated with a first closed-loop and a second UL transmission of the physical channel to a first TRP associated with a first closed-loop;
determine a first transmit power and a second transmit power based on the first and the second TPC commands, respectively;
apply the first transmit power and the second transmit power to the first UL transmission and the second UL transmission, respectively;
calculate a first and a second Power Headrooms, PHs, based on the first and the second transmit powers, respectively; and
report one of the first PH, the second PH, the maximum of the first and the second PHs, the minimum of the first and the second PHs, an average of the first and the second PHs, and both the first and the second PHs in a Power Headroom Report, PHR, carried in the first and the second UL transmissions.

25. A base station for enabling per Transmission Reception Point, TRP, uplink, UL, power control for a UL physical channel to be transmitted to multiple TRPs, comprising:
one or more transmitters;
one or more receivers; and
processing circuitry associated with the one or more transmitters and the one or more receivers, the processing circuitry configured to cause the base station to:
transmitting, to the wireless device, a configuration of a first and a second power control closed-loops for the physical channel, wherein the first and second power control closed-loops are associated with a first and a second TRPs, respectively;
transmit, to the wireless device, in a DCI a first Transmit Power Control, TPC, command and a second TPC command and an indication of a first UL transmission of the physical channel to the first TRP and a second UL transmission of the physical channel to the second TRP, respectively;
receive the first UL transmission at the first TRP with a first transmit power and the second UL transmission at the second TRP with a second transmit power; and
receive one of a first Power Headroom, PH, calculated based on the first transmit power, a second PH calculated based on the second transmit power, the maximum of the first and the second PHs, the minimum of the first and the second PHs, an average of the first and the second PHs, and both the first and the second PHs in a Power Headroom Report, PHR, carried in the first and the second UL transmissions.

* * * * *